US012341782B2

(12) United States Patent
Mohan et al.

(10) Patent No.: US 12,341,782 B2
(45) Date of Patent: Jun. 24, 2025

(54) SECURE ACCESS VIA A REMOTE CLIENT

(71) Applicant: Sonet.io, Inc., San Jose, CA (US)

(72) Inventors: Dharmendra Mohan, Sunnyvale, CA (US); Venu P. Banda, Cupertino, CA (US); Chenxing Wang, Campbell, CA (US); Fnu Chitralekha, Tracy, CA (US); Rama Raju Indukuri, McKinney, TX (US)

(73) Assignee: SONET.IO, INC., San Jose, CA (US)

( * ) Notice: Subject to any disclaimer, the term of this patent is extended or adjusted under 35 U.S.C. 154(b) by 0 days.

(21) Appl. No.: 18/786,884

(22) Filed: Jul. 29, 2024

(65) Prior Publication Data

US 2024/0388586 A1  Nov. 21, 2024

Related U.S. Application Data

(63) Continuation-in-part of application No. 18/318,595, filed on May 16, 2023, now Pat. No. 12,088,598.

(60) Provisional application No. 63/342,626, filed on May 16, 2022.

(51) Int. Cl.
*H04L 9/40* (2022.01)
(52) U.S. Cl.
CPC .................. *H04L 63/102* (2013.01)
(58) Field of Classification Search
CPC .................................................. H04L 63/102

USPC ........................................................ 726/27
See application file for complete search history.

(56) References Cited

U.S. PATENT DOCUMENTS

| 2009/0193451 A1* | 7/2009 | O'Neil | H04L 61/4535 |
| | | | 455/414.3 |
| 2015/0046790 A1* | 2/2015 | Singh | G06F 40/169 |
| | | | 715/234 |

OTHER PUBLICATIONS

Ericom Remote Browser Isolation, Retrieved at https://www.ericom.com/solutions/browser-isolation/, Retrieved on Apr. 2022, pp. 262.

* cited by examiner

*Primary Examiner* — Anthony D Brown
(74) *Attorney, Agent, or Firm* — Invoke

(57) ABSTRACT

Systems, methods, and computer-readable storage mediums are disclosed that prevent users from exchanging unauthorized content with a remote server via a client application. A system receives media instructions from a client application for rendering a user interface for the remote server on a user's device. Using the media instructions, the system determines permissions for accessing content to be presented in the user interface. Based on the permissions, the system generates modified media instructions and transmits the modified media instructions to a browser of the user device.

27 Claims, 17 Drawing Sheets

SECURE ACCESS VIA A REMOTE CLIENT

INCORPORATION BY REFERENCE; DISCLAIMER

Each of the following applications are hereby incorporated by reference: U.S. Provisional Patent Application 63/342,626, filed May 16, 2022, and is a Continuation in Part of U.S. patent application Ser. No. 18/318,595, filed May 16, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates generally to computer security, and more specifically, to controlling access to computer-accessible content.

BACKGROUND

Online computer security solutions protect users by restricting downloading of content that is dangerous, proprietary, confidential, illegal, or otherwise proscribed. For example, some computer security solutions prevent users from downloading and executing unpermitted information. In one such solution, "browser isolation" protects a user device from unpermitted information by remotely processing information at a secure system rather than processing the information locally at a user device. By doing so, the user device is safely isolated from the unpermitted information. For example, a browser isolation solution may generate web pages using a browser at a remote server. The remote server executes code associated with the web page and produces a series of static images or video from the web page for display by a browser of the user device. Other browser isolation solutions use Document Object Model (DOM) mirroring, where DOMs corresponding to a web page are sanitized before being sent to the user device and reconstructed before generating a web page.

The approaches described in this section are ones that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. In the drawings.

DETAILED DESCRIPTION

Figure 1:
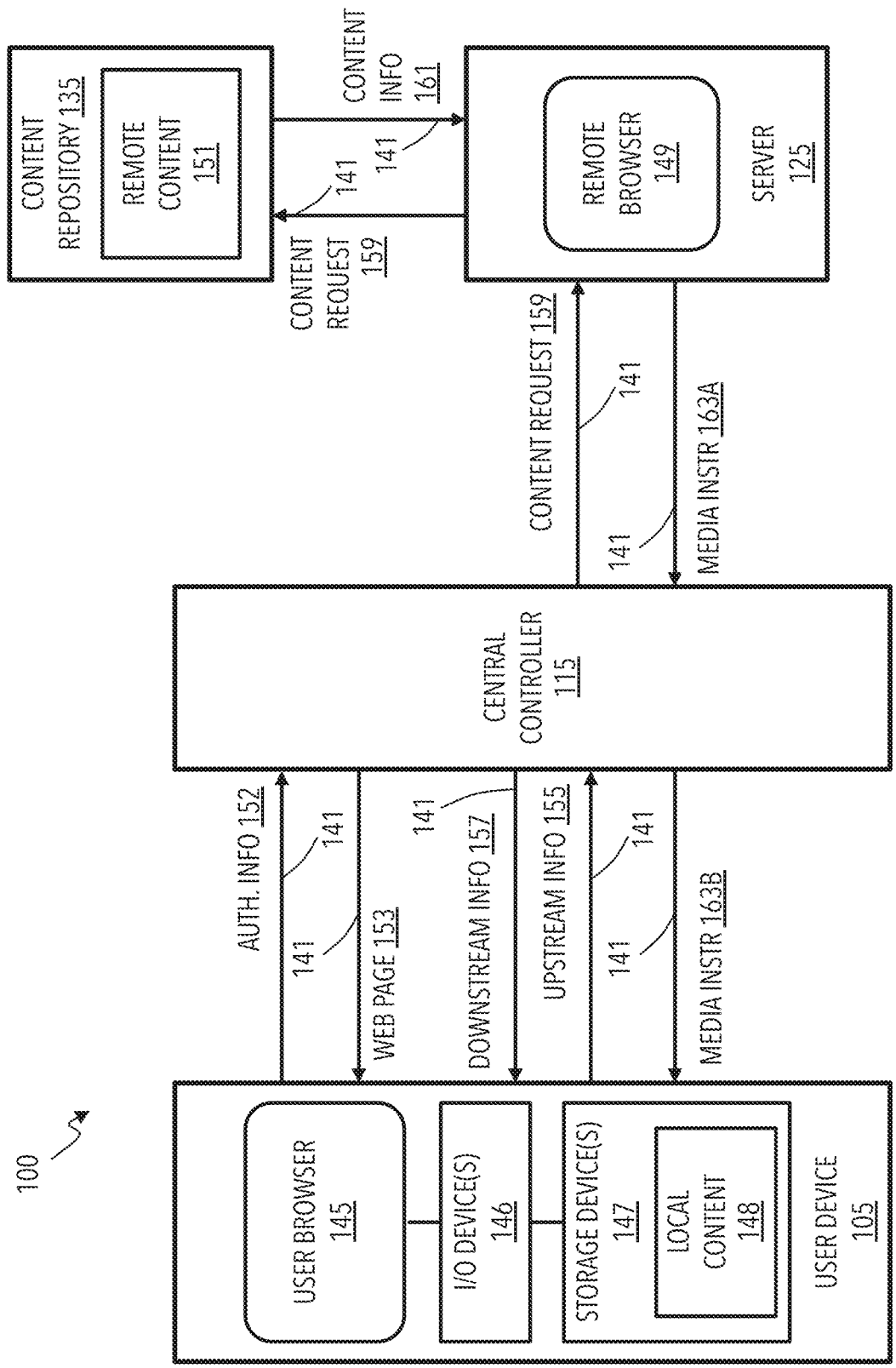
FIG. 1 shows a system block diagram illustrating an example of an environment for implementing systems and processes in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, conventional structures and devices are described with reference to a block diagram form to avoid unnecessarily obscuring the present disclosure.

1. GENERAL OVERVIEW
2. SYSTEM ARCHITECTURE FOR SECURE ACCESS VIA A REMOTE BROWSER
3. RESTRICTING AND MODIFYING CONTENT FROM A REMOTE BROWSER
4. EXAMPLE EMBODIMENT OF MODIFYING CONTENT FROM A REMOTE BROWSER
5. SYSTEM ARCHITECTURE FOR SECURE ACCESS VIA A REMOTE CLIENT
6. RESTRICTING AND MODIFYING CONTENT FROM A REMOTE CLIENT
7. HARDWARE OVERVIEW
8. MISCELLANEOUS; EXTENSIONS

1. General Overview

The present disclosure is directed towards computer security. More specifically, the present disclosure is directed to systems and methods that provide secure access to information on remote computing systems by preventing transmission and exfiltration of protected information and unpermitted information. One or more embodiments provide a computing system functioning as a protective layer between end-user devices and remote client applications. The protective layer enables the end users to interact with the remote computers while preventing downstream or upstream transmission of protected or unpermitted information. Additionally, the protective layer prevents upstream transmission of protected or unpermitted information from end-user devices. For example, the system operates a client application for a remote server in tandem with a local browser at an end-user device. Operations of the end user using the local browser (e.g., text, audio, mouse clicks, keystrokes, and movements) are mimicked on the client application, and the resulting output of the remote server transmitted to the client application is rendered at the local browser.

One or more embodiments of the computing system enable end users to access and interact with client applications at remote computers via the protective layer as if information at the client applications were locally executed at an end-user device itself. The system mimics upstream information (e.g., user inputs, browser selections, and data) transmitted from the end-user device to the remote computing system executing the client application. For example, the system mimics a command entered at a user's browser at the client application that causes the client application to control the remote server. The system also mimics downstream information from the client application (e.g., user interfaces and content) by translating and presenting the information at a browser of the end-user device. For example, responsive to the upstream information, the system mimics an output from a remote server to the client application in a display screen rendered by a user's browser.

One or more embodiments of the computing system operate as a proxy that restricts or enhances information transmitted between end-user devices and the client applications without any modifications to the original content retained at the information's source. Rules enforced by the system restrict access, modification and transmission of content, and information. The rules are statically or dynamically triggered based on one or more metrics, such as an application being accessed, end-user identity, end-user behavior, etc. Some embodiments maintain a log of end-user interactions with remote computers. The log includes potential permission violations, including events involving potential unpermitted content transmissions, metadata of the events (e.g., user identification, location, time, date, etc.), and audiovisual recordings (images or videos) of screens displayed at the end-user devices.

One or more embodiments of the computing system filter content transmitted between end-user devices and client applications. For example, the system may determine if an end user lacks permission to obtain some or all of the content or information transmitted to the client application from a remote server. Based on predefined permissions, contextual limitations, the user's current context (e.g., device, location, local time, behavior, etc.), and user inputs (e.g., mouse clicks), the system may limit or enhance downstream and upstream transmissions to/from the end-user device. Some embodiments modify the content to exclude unpermitted portions. The modifications may include replacing unpermitted content or enhancing the content with different information (e.g., warnings, notifications, watermarks, etc.)

One or more embodiments of the computing system modify downstream content and other information transmitted from the client application to end-user devices by determining media instructions for rendering the content rather than content itself. For example, the system may render a series of images representing a video as the video would appear in a browser rather than downloading the video itself to a user device. The system determines an initial set of media instructions usable for rendering the content received from a remote server. The system analyzes the downstream content and generates modified media instructions restricting, limiting, replacing, or augmenting the content that the end user is not permitted to access. Additionally, or alternatively, the system identifies unpermitted portions of the downstream content, determines media instruction for rendering the downstream or upstream content excluding the unpermitted portions, and enhances the downstream or upstream content with information (e.g., warnings or watermarks) before forwarding to the end-user device. Generating the media instructions for rendering the downstream content without the unpermitted portions may include modifying the media instructions received from the client application. The system transmits the modified media instructions that render the downstream content without the unpermitted content portion to the end-user device instead of transmitting the entire content as received from the client application to the end-user device. Further, the system transmits a notification to the end-user device indicating unauthorized portions have been removed, and/or the unauthorized portions are not permitted.

One or more embodiments of the computing system monitor and control the upstream information transmitted from the end-user devices. Upstream information includes user control inputs (e.g., mouse movements, mouse clicks, keystrokes, etc.), content (e.g., files), audio (e.g., sound from the local browser's mic output), and output from other attached devices (e.g., USB, hardware authentication keys, etc.). The system detects commands triggering actions of the client application. For example, inputs and commands may be operating systems commands, database queries, and network status requests. Based on the targets of the commands, predefined permissions, contextual limitations, and the user's current context, the system limits execution of the commands. The system detects and prevents uploading of restricted content, uploading of malware, manipulation of content (e.g., cut, copy, paste, keyboard inputs, audio inputs, etc.), printing of content, including personally identifiable information, and executing unpermitted database commands.

In a non-limiting example, a user may interact a browser executed at a user device to control with a client application for systems or services of a remote server. The user's inputs to the browser are transmitted upstream by the user device to a central controller. As described above, the central controller acts as a protective layer and/or a proxy that restricts, filters, and/or modifies information transmitted between the user device and the client application. The central controller mimics the client application as web page information in the browser of the user device. The web page information includes layout, style, and content information for rendering the web page in a browser application. The central controller determines a set of media instructions that, when executed in the end-user's browser, render an image of a user interface of the client application in the browser. The central controller generates media instructions modifying the content and information included in the user interface to limit or enhance the copy of the user interface displayed at the end-user's browser.

By analyzing the content and information transmitted from the client application to the end-user device based on user profiles, permissions, and contextual information, the central controller determines if the user lacks permission to access any portion of the content and information. Responsive to determining that the user lacks permission to access a particular portion of the content, the central controller generates modified media instructions for rendering a web page representing the client user interface that exclude the unpermitted content. In some cases, the central controller replaces the unpermitted content with a notification indicating the content is forbidden to the user. Additionally, or alternatively, the central controller enhances the content with additional information such as a watermark. The central controller transmits the modified media instructions to the user device that renders the web page from the modified media instructions using the browser. As the modified media instructions provide information for drawing a web page restricted to content that is permitted, the central controller prevents the end-user from receiving and exfiltrating unpermitted information. Further, the central controller prevents the user from transmitting unpermitted information from the user device to the client application.

One or more embodiments described in this Specification and/or recited in the claims may not be included in this General Overview section.

2. System Architecture for Secure Access via a Remote Browser

FIG. 1 shows a block diagram illustrating an example of an environment 100 for implementing systems and processes in accordance with aspects of the present disclosure. The environment 100 may include a user device 105, a central controller 115, a server 125, and one or more content repositories 135. The user device 105 is a computing system that is communicatively connected, directly or indirectly, to the central controller 115, the server 125, and the content repository 135 via one or more communication channels 141. The communication channels 141 may include one or more wired or wireless data links and/or a communication networks, such as local area networks, peer-to-peer networks, wide area networks, and the Internet.

The user device 105 may be a personal computer system, a smart phone, a tablet computer, a laptop computer, or other programmable user computing device. The user device 105 may include a user browser 145, one or more input/output (I/O) devices 146, and a storage device 147. The user browser 145 may be any web browser application that renders an interactive user interface (e.g., a graphic user interface) that the user interacts with. The I/O devices 146 are devices that the user can interact with. The I/O devices 146 include any device that enables the user to provide and/or receive information from the user device 105, such as a pointer device (e.g., a mouse), a keyboard, a touchscreen, an audio transducer (e.g., a microphone and speakers), a portable storage device (e.g., a universal serial bus storage device), a hardware security key, a biometric reader device, etc. The storage device 147 includes, for example, one or more flash drives and/or hard disk drives that store local content 148. Local content 148 includes any type of information, such as documents, text, images, audio and video files, libraries, user data, etc.

The central controller 115 includes one or more server computers that provide a protective layer that intercepts, processes, and relays information communicated between the user device 105, the server 125, and the content repository 135 through one or more of the communication channels 141. As discussed below, the central controller 115 limits access to content sources, such as content repository 135, by a user of the user device 105. Additionally, the central controller 115 selectively refrains from transmitting some or all of the content 151 communicated from the server 125 to the user device 105. Additionally, the central controller 115 limits transmission of upstream information 155 (e.g., user inputs and local content 148) to the server 125.

The server 125 is one or more computing devices that execute a remote browser 149 corresponding to the user browser 145. In some embodiments, the remote browser 149 and the user browser 145 mimic one another. The server 125 may be, for example, a web application provider such as software-as-a-service (SaaS) platform. One or more embodiments of the server 125 receive a content request 159 from the central controller 115, relay the content request 159 to a content repository 135 identified in the content request 159, and receive content information 161, such as web page information, in response. The content request 159 includes a request to upload or download content. The remote browser 149 processes the content information 161 to detect and remove unpermitted content to sanitize the content information 161. For example, the remote browser 149 may be an isolated web browser application that executes the content information 161 in a sandboxed container and identifies unpermitted information or other security risks. Further, the remote browser 149 determines media instructions 163A for rendering the content information 161 for display. The server 125 transmits the media instructions 163A to the central controller 115 for analysis and provision to the user device 105.

The content repository 135 is a computing system that distributes content such as the content 151. The content repository 135 may host any type of web site or information repository. The content 151 is any type of information, including documents, text, images, audio, and video files, for example. Additionally, the content 151 may be mix of open, public, private, confidential, proprietary, and proscribed information.

In one or more example embodiments, a user of the user device 105 interacts with a user interface (e.g., a web page 153) provided by the central controller 115 via the user browser 145 and the I/O devices 146 to request and receive the content 151 from the content repository 135. The user may input and output information using one or more input techniques, including: accessing information on a storage device manually (e.g., using a keyboard and selection device), via voice (e.g., using a microphone), visually (e.g., using gestures and eye-tracking), etc. The interaction with the central controller 115 may include providing authentication information 152 to the central controller 115. The authentication information 152 may include login credentials, geolocation data, biometric information, etc., provided using an I/O device (e.g., a keyboard, fingerprint reader, retina scanner, etc.), cryptographic security key, or the like. Using the authentication information 152 and other contextual limitations (e.g., user behavior patterns), the central controller 115 authenticates the identity and location of the user. Responsive to successful authentication, the central controller 115 determines user profile information, including permissions, rules, authorizations, constraints, exclusions, etc. For example, based on the user profile, the central controller 115 may determine that the user is permitted to access one or more content sources of a predetermined set of content sources including the content repository 135.

The central controller 115 provides the user device 105 with an interactive web page 153 locally rendered by the user browser 145 that presents downstream information 157. The web page 153 comprises a structured combination of user interface elements, such as hyperlinks, radio buttons, drop down menus, scroll bars, etc., via the user browser 145 presents the downstream information 157 in an interactive display. In some embodiments, the web page 153 mimics a web page at the remote browser 149. The user may view and interact with graphic elements presented in the web page 153 to upstream information 155 using the I/O devices 146. The user browser 145 communicates the upstream information 155 to the central controller 115. The upstream information 155 includes control information and media information. Control information represents actions that may be mimicked between the local and remote browser. For example, the control information may include user inputs, such as mouse clicks, key strokes, mouse movements, window resizing, pinching, zooming, etc. Media information may include data files for upload/download, biometric information, security key data, etc.

In response to the upstream information 155 received from the user via the user device 105, the central controller 115 transmits a content request 159 requesting remote content 151 from the content repository 135 using the remote browser 149. Some embodiments intercept the upstream information 155 to selectively block or limit transmission of the content request by applying appropriate policies or permissions. For example, the central controller 115 prevents communication of confidential or personally identifiable information from the user device 105.

In response to the content request 159, the content repository 135 transmits content information 161 to the remote browser 149. The content information 161 may be, for example, audio, video, images, and/or text information for rendering a web page, including the requested remote content 151. The content information 161 includes the remote content 151 directly or indirectly by reference to an external source. The remote browser 149 processes the content information 161 to detect and remove unpermitted information and other security threats. Also, using the content information 161, the remote browser 149 determines media instructions 163A for generating the content information 161. The media instructions 163 sent to the user device 105, when executed by the user browser 145, render the corresponding web page, including audio, video, images, and/or text. For example, media instructions 163 could be graphical instructions such as DrawRect, DrawImage, DrawText at given coordinates, move cursor, etc.

The server 125 communicates the media instructions 163A, including the remote content 151, to the central controller 115 that analyzes the content 151 to determine if the user is permitted to access some or all of the content 151. For example, the central controller 115 determines if the user is permitted to access the remote content 151 based on the user's profile information, permissions, and context. For example, the user profile information defines locations, time frames, device information, and behavioral patterns used to determine the user's permission to access the remote content 151. Also, determining permission to access content by the user may be based on metadata describing the content's source, type, classification (e.g., classified, confidential, proprietary, etc.), subject matter, text, audio, and images. Permission to access the content may also be determined based on the content itself, including text data and image data included in the content. For example, the central controller 115 identifies unpermitted content using a machine learning model or a bag-of-words search of the remote content 151 as well as metadata of the remote content 151 to identify terms or combinations of terms included in the content. Additionally, one or more embodiments of the central controller maintains a library of information identifying sources, types, classification, text, and images that are not permitted.

In response to determining that the user lacks permission to access a subset of the content 151, the central controller 115 generates modified media instructions 163B and transmit the modified media instructions 163B to the user device 105 for display by the user browser 145. Modifying the media instructions 163A for rendering the content information 161 includes altering the media instructions 163A to remove elements corresponding to the unpermitted content. Additionally, modifying the media instructions 163A includes replacing the elements corresponding to the unpermitted content with modified content such as instructions to display notification. Further, modifying the media instructions 463A includes adding content such as by watermarking the content. The user browser 145 receives the modified media instructions 163B and generate the modified media instructions 163B such that the user device 105 displays the content 151 without a user viewing or accessing any unpermitted subsets of the content 151.

While the above example describes the central controller 115 analyzing and limiting downstream information 157 from the server 125 and the content repository 135, those in the relevant arts will understand that the server 125 also performs the same or similar operations for upstream information 155 from the user device 105. For example, the server may prevent upstream transmission of confidential, personal, or malicious information in the upstream information 155 from the user device 105. Additionally, while the central controller 115, the server 125, and the content repository 135 are illustrated in FIG. 1 as separate systems, one or more embodiments combine some of the functionality of the central controller 115, the server 125, and the content repository 135 into a single system or divide the functionality among more systems. For example, one or more embodiments of the server 125 include functionality of the content repository 135 and also store the content 151. Also, in one or more embodiments, a single system include the functionality of the user device 105 and the central controller 115, and/or a single system may include the functionality the server 125 and the content repository 135. Further, one or more embodiments maintain the content 151 in a system separate from the content repository 135.

Figure 2:
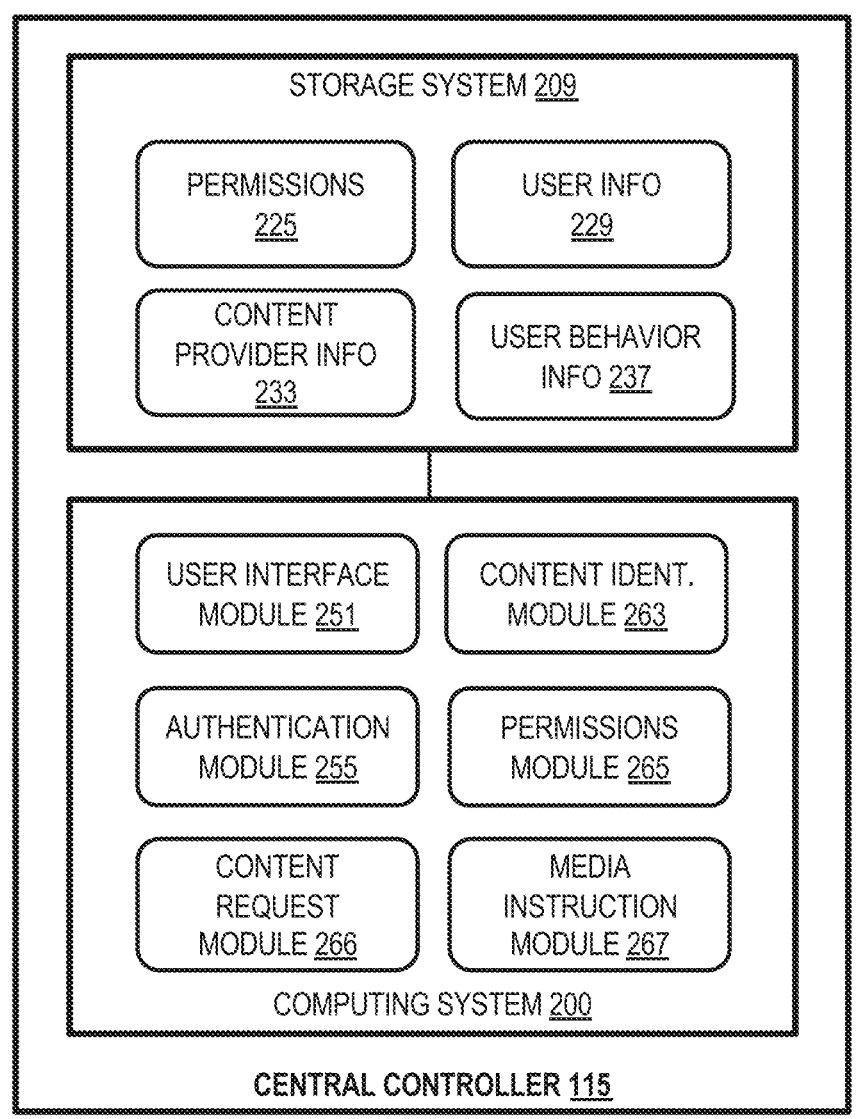
FIG. 2 shows a block diagram illustrating an example of a computing system in accordance with one or more embodiments.

FIG. 2 shows a system block diagram illustrating an example of a central controller 115 that can be the same or similar to that described above. The central controller 115 includes hardware and software that perform the processes and functions disclosed herein. One or more embodiments of the central controller 115 comprise a computing system that enables a user device (e.g., user device 105) to securely access and display content (e.g., content 151) from content sources (e.g., content repository 135) via a remote browser (e.g., remote browser 149 of server 125) by preventing transmission of unpermitted information to and from the user device.

In one or more embodiments, the central controller 115 includes a computing system 200 and a storage system 209. The computing system 200 includes one or more processors (e.g., microprocessor, microchip, or application-specific integrated circuit). The storage system 209 may comprise one or more computer-readable, non-volatile hardware storage devices that store information and program instructions used by the processes and functions disclosed herein. For example, the storage system 209 may be one or more flash drives and/or hard disk drives.

One or more embodiments of the storage system 209 store permissions 225, user information 229, content source information 233, and user behavior information 237. The permissions 225 may include authentications, roles, policies, etc. The permissions 225 may apply to individual users or groups of users. For example, the permissions 225 may apply to an individual employee, a class of employees, or the entire personnel of an organization. The permissions 225 may also define devices, content sources, web sites (e.g., uniform resource locators (URLs)), and information that users and client devices are permitted to access or unpermitted to access. For example, the permissions 225 may apply to an individual device (e.g., a particular server), individual content sources, classes of devices, and classes of content sources. Device-based permissions may correspond to, for example, a device identifier (e.g., universally unique identifier) and an Internet protocol (IP) identifier (e.g., IP address). Further, the permissions 225 may define, for example, content-based, role-based, time-based, and location-based restrictions on access to the devices, content sources, and information and information contained therein. Content-based permissions define limitations on types of content, such as personal-identifiable information, confidential information, malware, or otherwise proscribed information. Time-based permissions correspond to users' working hours, non-working hours, working days, non-working days, etc. Location-based permissions correspond to the users' employer locations, work site, residence, etc. For instance, the permissions 225 define different restrictions during the time the user is located at a place of employment using an employer-issued computer during working hours versus times when the user is located outside the place of employment during non-working hours using a personal computer.

The user information 229 includes information describing characteristics of individual users. The user information 229 include, for example, individual users' identification information, biometric information, security level, employer, employment type, job type, employment location, residence information, working hours, etc. By applying the permissions 225 to the user information 229, the central controller 115 may determine the devices, content, and information users that are permitted to access in different contexts. For example, the central controller 115 may permit a software programmer to access different online services than an accountant.

The content source information 233 includes information describing particular content sources (e.g., content repository 135). For example, the content source information 233 may include a profile for content sources indicating type (e.g., public, private, business, government, social, blog, news, etc.), security information (e.g., confidential, proprietary, public, forbidden, compromised, etc.), location information, and type of information (e.g., type of content information). The content source information 233 defines a level of secure access the central controller 115 permits users to have when interacting with the content sources. For example, some content sources, such as streaming entertainment services, may lack limits on access. In such cases, the central controller 115 may allow content to pass to a client device with no restriction. Other content sources, such as confidential enterprise management systems, may be fully secure and block access by unauthorized users. In such cases, the central controller 115 monitors, records, and analyzes individual upstream and downstream interactions between the client device and the secure content source. Those in the relevant arts will understand that some implementations may have additional levels of secure access.

The user behavior information 237 includes profile information classifying particular end-users' past activities. For example, the behavior information may classify the user's interaction patterns, such as login and access behavior, browsing behavior, data requested by the user, and data transmitted by the user. The interaction patterns describe the user's past interactions with a content source. Based on the user behavior information 237, one or more embodiments detect, identify, and limit anomalous behaviors that may indicate activities that are anomalous and/or that deviate from historical interaction patterns with the content repository. For example, user behavior information 237 may include metrics classifying a user's typical devices, locations, work hours, interactions, typing speed, application usage, content sources, quantities of information, applications usage, and sequences of actions. Using the user behavior information 237, the central controller 115 determines if a user's behavior is within one or more ranges of activity, such as normal activity, anomalous activity, and suspicious activity. Doing so enables embodiments to, for example, detect malefactors from stealing data by impersonating authorized users.

Still referring to FIG. 2, the computing system 200 executes a user interface module 251, an authentication module 255, a content identification module 263, a permissions module 265, a content request module 266, and a media instruction module 267. The user interface module 251 may be hardware, software, or a combination thereof that provides a user interface to a user at a user device (e.g., user device 105). One or more embodiments of the user interface module 251 execute a remote user interface (e.g., web page 153) for the user via a browser application (e.g., user browser 145) at the user device. In some embodiments, the user interface module 251 mimics a user interface at the server (e.g., server 125) based on media instructions (e.g., media instructions 163) received from the server. Through the user interface, the central controller 115 displays, at the user device, a menu of online services, devices, content sources, content, and information for selection by the user. For example, the remote user interface may be a web page (e.g., a dashboard) corresponding to a particular employee or class of employees, including hyperlinked icons or text, to a selected set of productivity applications and websites. Additionally, the user interface module 251 sends/receives control inputs (e.g., upstream information 155) to/from the user interface. For example, the user interface module 251 may track and interpret user control inputs at the user device (e.g., keyboard entries and mouse clicks) corresponding to selections of the hyperlinked icons or text. Further, in response to receiving control inputs from the user device, the user interface module 251 may interpret the control inputs and generate content requests (e.g., content request 159). For example, the control inputs may identify a hyperlink to content (e.g., content 151) at a content source (e.g., content repository 135) such as a web page.

The authentication module 255 may be hardware, software, or a combination thereof that receives and verifies user authentication information (e.g., authentication information 152) using the permissions 225, the user information 229, and the user behavior information 237. The authentication module 255 verifies the user's identity based on the authentication information and determine if the user is permitted to access the central controller 115. Also, the authentication module 255 determines a current context of the user and determine if the user is authorized to access the central controller 115 in the current context. The current context may include, for example, the current time, the user device identifier, and the user device's location. Further, the authentication module 255 determines if the current context corresponds to the user's past behavior patterns by comparing the context to the user behavior information 237.

The content identification module 263 may be hardware, software, or a combination thereof that analyzes content information (e.g., content information 161) to identify content (e.g., 151). Content identification module 263 analyzes upstream information (e.g., content transmitted from a user device 105 to the content repository 135) and downstream content (e.g., content transmitted from the content repository 135 to the user device 105) to prevent communication of protected information, including data that is personally identifiable, confidential, sensitive, or unpermitted, etc. The content identification module 263 identifies the content for analysis. For example, the content identification
    module identifies content included in the content information as well as links or pointers to content and store the identified content for analysis.

The permissions module 265 may be hardware, software, or a combination thereof that interprets content (e.g., content 151) and determines if any content violates the permissions 225. The permissions module 265 analyzes the content based on user profiles, permissions (e.g. policies), and contextual information. Based on the analysis, the permission module 265 determines if a user lacks permission to share or access any portion of the content. For example, the permissions module 265 determines if information is protected based on the source of the content, text of the content, and metadata of the content. The permissions module 265 determines if the content includes unpermitted information for an employee based on the employee's position, security clearance, and current context (e.g., time, location, device, and behavior). One or more embodiments use artificial intelligence to determine if content is forbidden to a certain user. For example, a machine learning model may be trained and applied to context information to classify a user's behaviors, such as location, time, and series of interactions, as inconsistent with the user's past behavior patterns.

In addition, the permissions module 265 analyzes upstream information (e.g., data input and control inputs) and by applying appropriate policies or permissions, determine if the upstream information should be blocked, limited, or permitted to proceed for further processing. Examples of control input include user interactions with I/O devices such as mouse clicks. An example of data input includes content being uploaded in response to a control input. By doing so, the permission module 265 limits the information uploaded to the content repository with regards to personally identifiable information and other impermissible content that would have liability implications.

The content request module 266 may be hardware, software, or a combination thereof that generates content requests (e.g., content request 159). The content request module 266 executed will remove, replace, or add content identified by content identification module 263 and permissions module 265.

The media instruction module 267 may be hardware, software, or a combination thereof that generates media instructions (e.g., media instructions 165) that when executed by the user's browser will result in content 151 (with appropriate restrictions and enhancements) being displayed. For example, the media instruction module 267 may include code of a browser application that generates media instructions for rendering a web page. The media instruction module 267 generates instructions that when executed will remove, replace, or add content identified by content identification module 263 and permissions module 265.

3. Restricting and Modifying Content from a Remote Browser

The flow diagrams in FIGS. 3A, 3B, 3C, and 3D illustrate examples of the functionality and operation of possible implementations of systems, methods, and computer program products according to various implementations consistent with the present disclosure. Each block in the flow diagrams of FIGS. 3A, 3B, 3C, and 3D represent a module, segment, or portion of program instructions that include one or more computer executable instructions for implementing the illustrated functions and operations. In some alternative implementations, the functions and/or operations illustrated in a particular block of the flow diagram may occur out of the order shown in FIGS. 3A, 3B, 3C, and 3D. For example, two blocks shown in succession may be executed substantially concurrently, or the blocks may sometimes be executed in the reverse order, depending upon the functionality involved. Each block of the flow diagram and combinations of blocks may be implemented by special purpose hardware-based systems that perform the specified functions or acts or combinations of special purpose hardware and computer instructions FIGS. 3A, 3B, 3C, and 3D show a process flow block diagram 300 illustrating an example of a process in accordance with one or more embodiments. At block 303, a system (e.g., central controller 115) receives user authentication information (e.g., authentication information 152) from a user device (e.g., user device 105). At block 311, the system authenticated the user. For example, the system may authenticate the user by verifying the user identity and credentials. Also, the system may determine a current context for the access. If the user is authorized to access the central controller 115 in the current context, the system determines if the current context corresponds to the user's past behavior patterns based on, for example, permissions, user information, and user behavior information. Additionally, the system may authenticate the user based on the location of the user device and the device profile (make, OS version, device type, etc.). The geolocation information may be determined by the user device based on, for example, global positioning system data. The geolocation information may also be estimated by the system based on an Internet Protocol address of the user device.

Figure 6A:
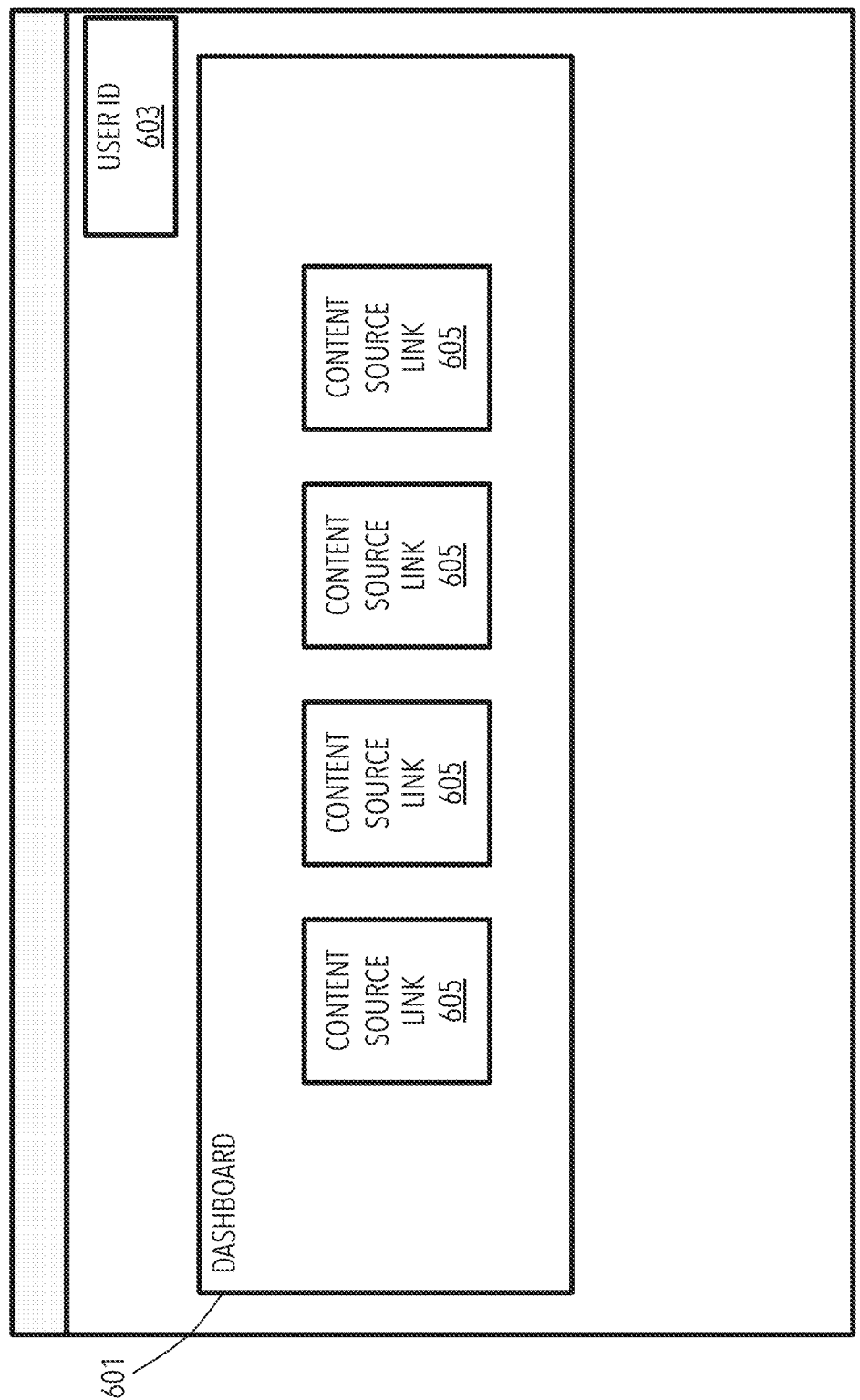
FIGS. 6A, 6B, and 6C show pictures of example screens displayed by a system in accordance with one or more embodiments.

At block 315, responsive to successful authentication of the user at block 311, the system transmits a dashboard (e.g., web page 153) to the user device. The dashboard indicates information accessible through the system authorized for the particular user based on the authentication at block 311. One or more embodiments display the dashboard information using a browser application executed by the user device (e.g., user browser 145). FIG. 6A illustrates a picture of an example dashboard 601 for a particular user 603, including hyperlinked icons 605 to one or more authorized online service providers. The accessible information includes one or more sets of services, content sources, content, documents, etc. The system modifies the sets of services, content sources, content, documents, etc. included in the dashboard based on the user's current context. For example, the icons 605 may vary depending on the user's location and work schedule. In one or more embodiments, the dashboard mimics a dashboard generated at a remote browser (e.g., remote browser 149) of a server (e.g., server 125).

At block 317, the system receives one or more user inputs selecting content or a content source from the dashboard information displayed of user device at block 315. Receiving the selection includes receiving control information (e.g., via upstream information 155). For example, the user browser may receive user inputs, such as mouse clicks and keyboard entries that interact with the dashboard. The user browser transmits the control inputs indicating a selection from the dashboard to the system. In one or more embodiments, the user inputs and operations of the user browser are mimicked by the remote browser of the server as previously discussed above.

At block 318, the system determines if upstream information should be restricted (e.g., blocked or limited). As previously described, the system (e.g., executing permission module 265) analyzes upstream information (e.g., data input and control inputs involved in the selection at block 317) using policies or permissions. The analysis determines if the upstream information should be blocked, restricted, or permitted. If the system determines the upstream information is not restricted (e.g., block 318 is "No"), the process 300 proceeds to block 319. On the other hand, if the system determines the upstream information is at least partially restricted (e.g., block 320 is "Yes"), then the process 300 proceeds to block 353 in FIG. 3C as indicated by off-page connector "F."

At block 353, the system analyzes the upstream information to identify the unpermitted content. As previously described, the system determines if content is permitted based on user information, permissions, and behavior patterns. For example, the system may determine the user lacks permissions to access certain content based on a user's job title and permissions corresponding to the job title. Also, the system may determine if the user lacks permissions to access certain content based on the user's current context (e.g., time, location, device) being anomalous from their usual pattern of behavior for accessing the proprietary content from their work location during normal business hours. Further, the system may determine the certain types of content, such as confidential or personally identifiable information that is restricted.

At block 355, the system determines if the user is permitted to upload a subset of the content based on the analysis at block 353. If not (e.g., block 355 is "No"), then at block 357, the system transmits media instructions including notification to the user browser that upstream information is restricted or forbidden. Some embodiments may then return to block 319 as indicated by off-page connector "G." On the other hand, if the user is permitted to upload a subset of the content (e.g., block 355 is "Yes"), then at block 358, the system determines a modified content request redacting the forbidden subset and/or enhancing the content that the user lacks permission to access. At block 359, the system transmits the modified content request determined at block 358 and return to block 319 as indicted by off-page connector "G."

At block 319, the system mimics the user inputs received at block 317 in the user browser at the remote browser. For example, the user inputs may control the user browser to interact with the graphic user interface (GUI) element displayed by the locally rendered web page, such as opening a menu tab and selecting a hyperlink to content (e.g., content 151). The interactions with the GUI element at the local browser are mimicked at the remote browser. In some embodiments, the local browser and remote browser substantially mirror one another by mimicking GUI elements, content, interactions, animations, etc. occurring in either browser throughout the process 300.

At block 320, the system determines if the user is permitted to access the content selected at block 317. For example, the system may determine if the end user lacks permission to obtain any of the content requested from a content source. Based on a user's predefined permissions, contextual limitations, the user's current context, (e.g., device, location, local time, behavior, etc.), and user inputs (e.g., mouse clicks), the system limits the content selected content. If not (e.g., block 320 is "No"), then the process 300 proceeds to block 371 described below as indicated by off-page connector "D." On the other hand, if the system determines the use is permitted to access the selected content (e.g., block 320 is "Yes"), then the process 300 proceeds to block 321.

At block 321, the system requests the content selected from the content source selected by the user at block 317. In some embodiments, as previously described at block 319, the remote browser mimic the user inputs made at the local browser by mirroring the inputs (received, e.g., in upstream information 155). Additionally, the mimicking may include mirroring changes occurring at the local browser. In some other embodiments, the system transmits a content request (e.g., content request 159) received from the local browser to the remote browser. The remote browser transmits the content request to the content source selected at block 317.

At block 323, the system determines if the content source is a controlled content source. If not, proceeding to FIG. 3D via off-page connector "A," then at block 363, the system passes media instructions to transmit the requested content (e.g., text, audio, and/or video) from the selected content source to user browser without any modification. For example, the system may pass through commercial multimedia content from predefined entertainment providers. Some embodiments may then return to block 317 as indicated by off-page connector "E."

On the other hand, if the content source is a controlled source (e.g., block 323 is "Yes"), then at block 327, the system receives media instructions (e.g., media instructions 163A) from the remote browser media instructions for representing the content (e.g., content information 161), including the content requested at block 321. The media instructions may be information that generates the content information (e.g., content information 161) of a web page. For example, the content information may be a text document such as a hypertext markup language (HTML) document encoded in a Unicode format (e.g., UTF-8).

Figure 3A:
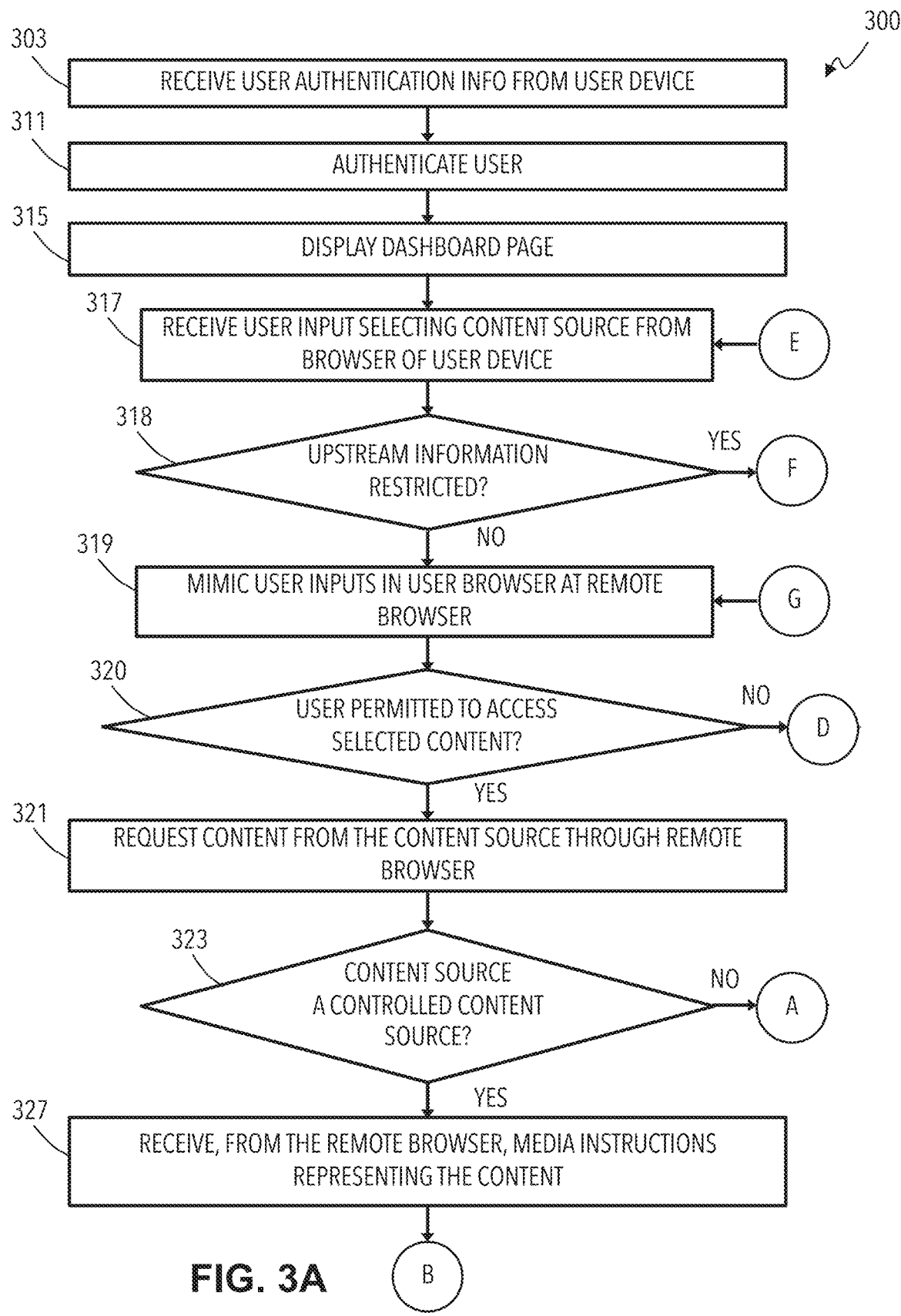
FIGS. 3A, 3B, 3C, and 3D show a process flow block diagram illustrating an example of a process in accordance with one or more embodiments.
Figure 3B:
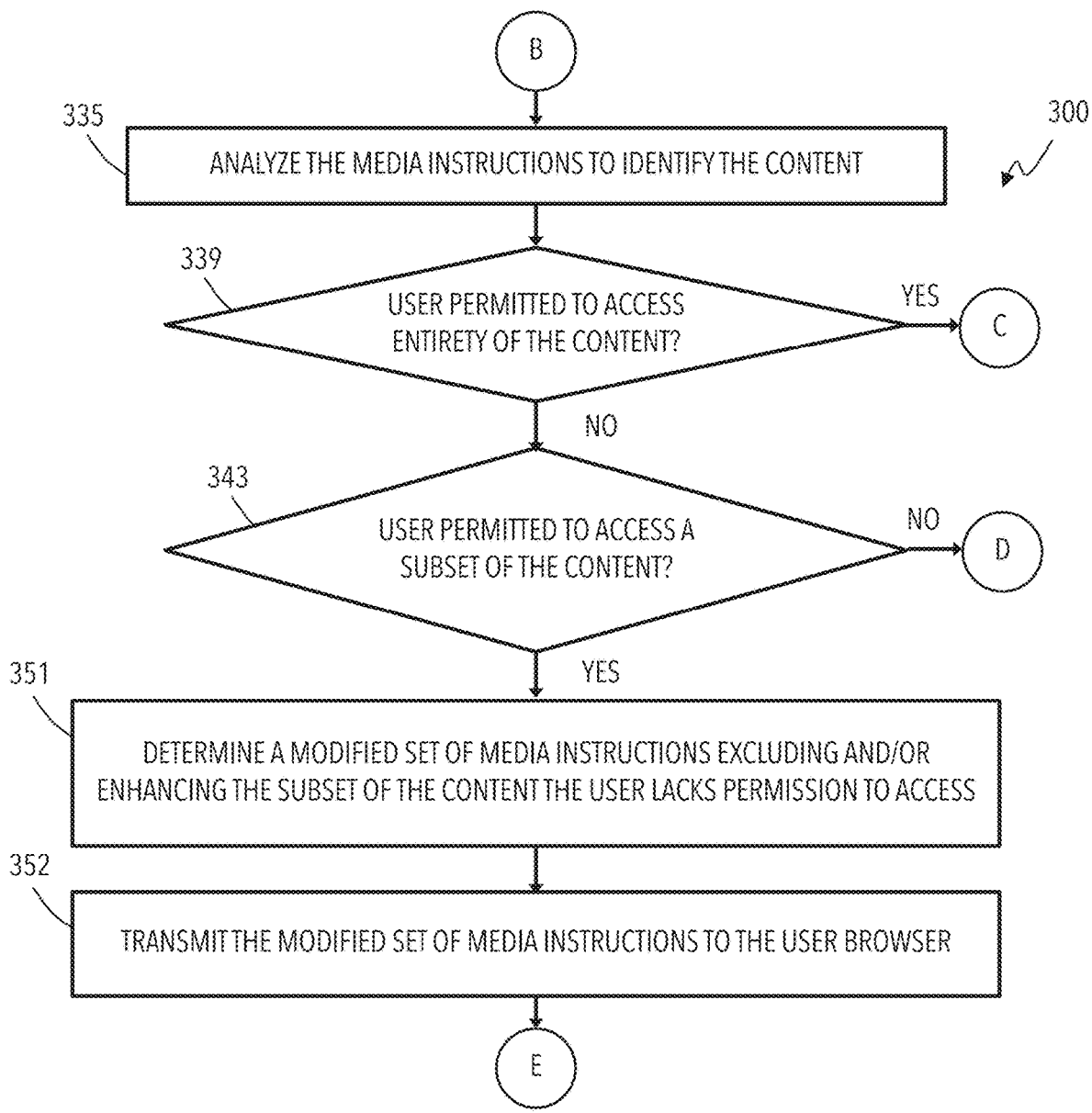
Figure 3C:
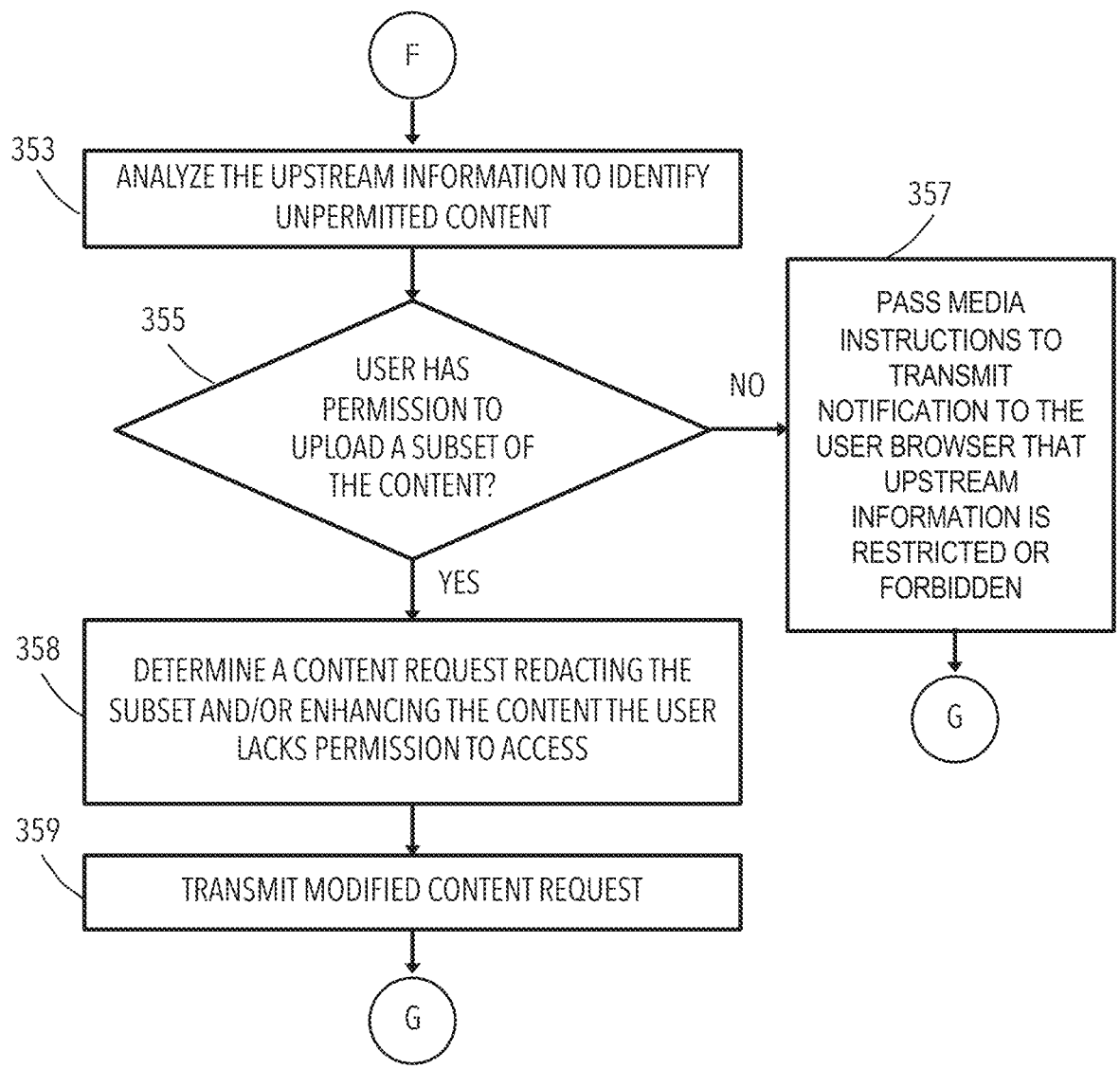

Continuing to FIG. 3B as indicated by off-page connector "B," at block 335, the system analyzes the media instructions received at block 327 to identify content included in the content information. At block 339, the system determines if the user is permitted to access an entirety of the content identified at block 335. As previously described, the system determines if content is permitted based on user information, permissions, and behavior patterns. For example, the system can determine if the user lacks permissions to accesses the web page based on a user's job title and the permissions corresponding to the job title. Also, the system can determine if the user lacks permissions to access the web page based on the user's current context (e.g., time, location, device) being anomalous from their usual pattern of behavior for accessing the proprietary content from their work location during normal business hours. If the user is permitted to access the entirety of the content (e.g., block 339 is "Yes"), then continuing to FIG. 3D via off-page connector ("C") at block 367, the system passes media instructions to transmit the content (e.g., text, audio, images, and/or video) received at block 323 to the user browser. Transmitting the content includes processing the content and sending unmodified media instructions for rendering by the user device. Some embodiments may then return to block 317 as indicated by off-page connector "E."

Figure 6B:
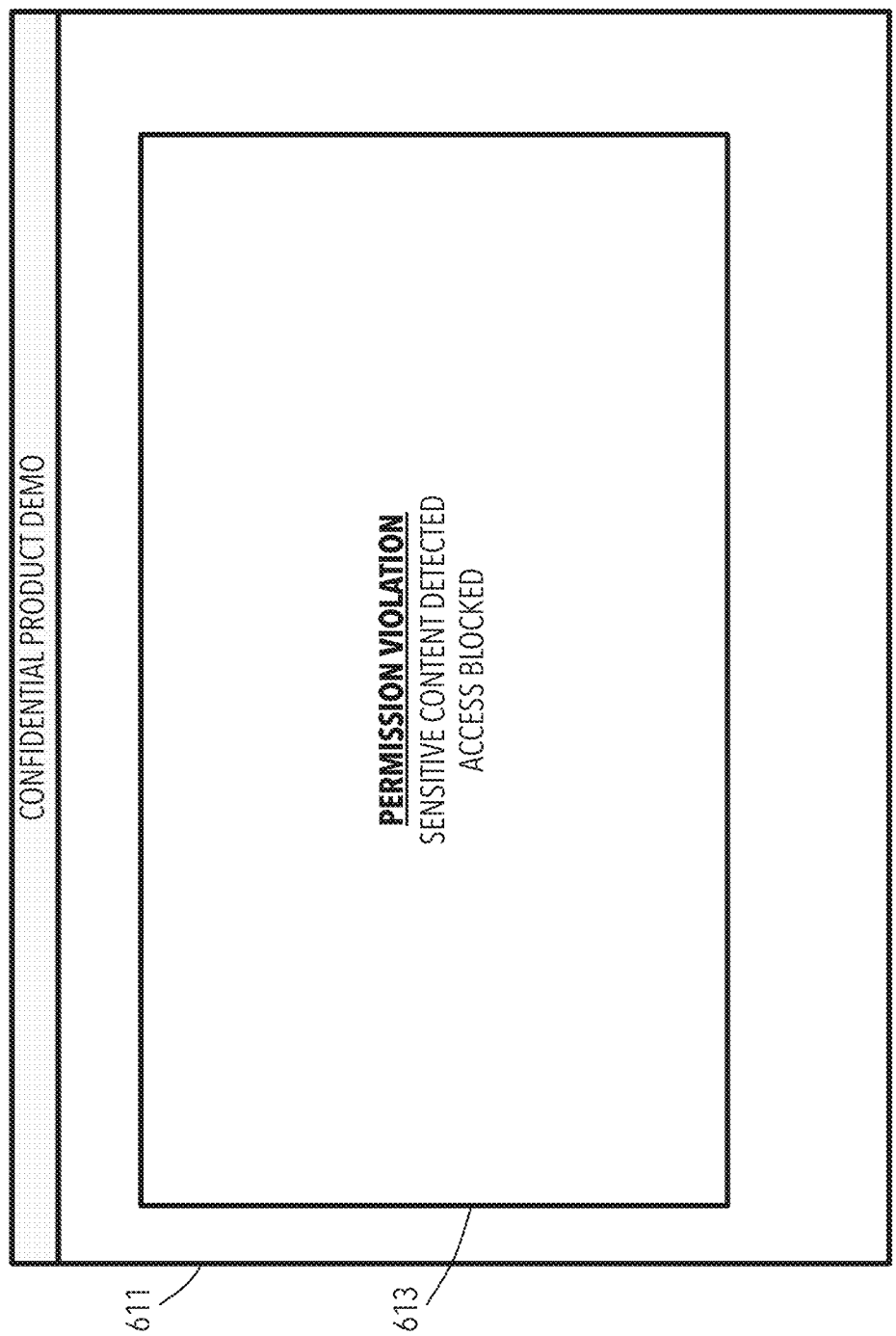

On the other hand, if the user is not permitted to access the entirety of the content (e.g., block 339 is "No"), then at block 343, the system determines if the user has permission to access at least a subset of the content. The system may identify at least the subset of the first content that the user lacks permission to access. For example, the system may determine the user lacks permission to access a subset of the content included in the web page that is highly confidential business information based on the permissions and the user's job title. Also, the system may determine the user lacks permission to accesses a subset of the content that is proprietary based on the user's current context (e.g., time, location, device) being anomalous from their usual pattern of behavior for accessing the proprietary content from their work location during normal business hours. If the user lacks permission to access any of the content (e.g., block 343 is "No"), then at block 371 in FIG. 3D as indicated by off-page connector ("D"), the system passes media instructions to transmit one or more notifications to the user browser that accessing the first content is forbidden. For example, FIG. 6B illustrates a picture of an example web page 611 transmitted to the user browser at block 371, including a notification 613 indicating that the requested content violates permissions, and the access is blocked to the user. Some embodiments may then return to block 317 as indicated by off-page connector "E."

On the other hand, if the user has permission to access a subset of the content (e.g., block 343 is "Yes"), then at block 351, the system determines a modified set of media instructions excluding the subset of the first content that the user lacks permission to access. Modifying the media instructions may include replacing the subset of the content identified at block 343. In some implementations, modifying the media instructions removes the unpermitted content. In some other implementations, modifying the media instructions replaces the subset of content. For example, the system may replace the subset of the content with a notification that indicates that the subset of the content is not permitted.

Figure 6C:
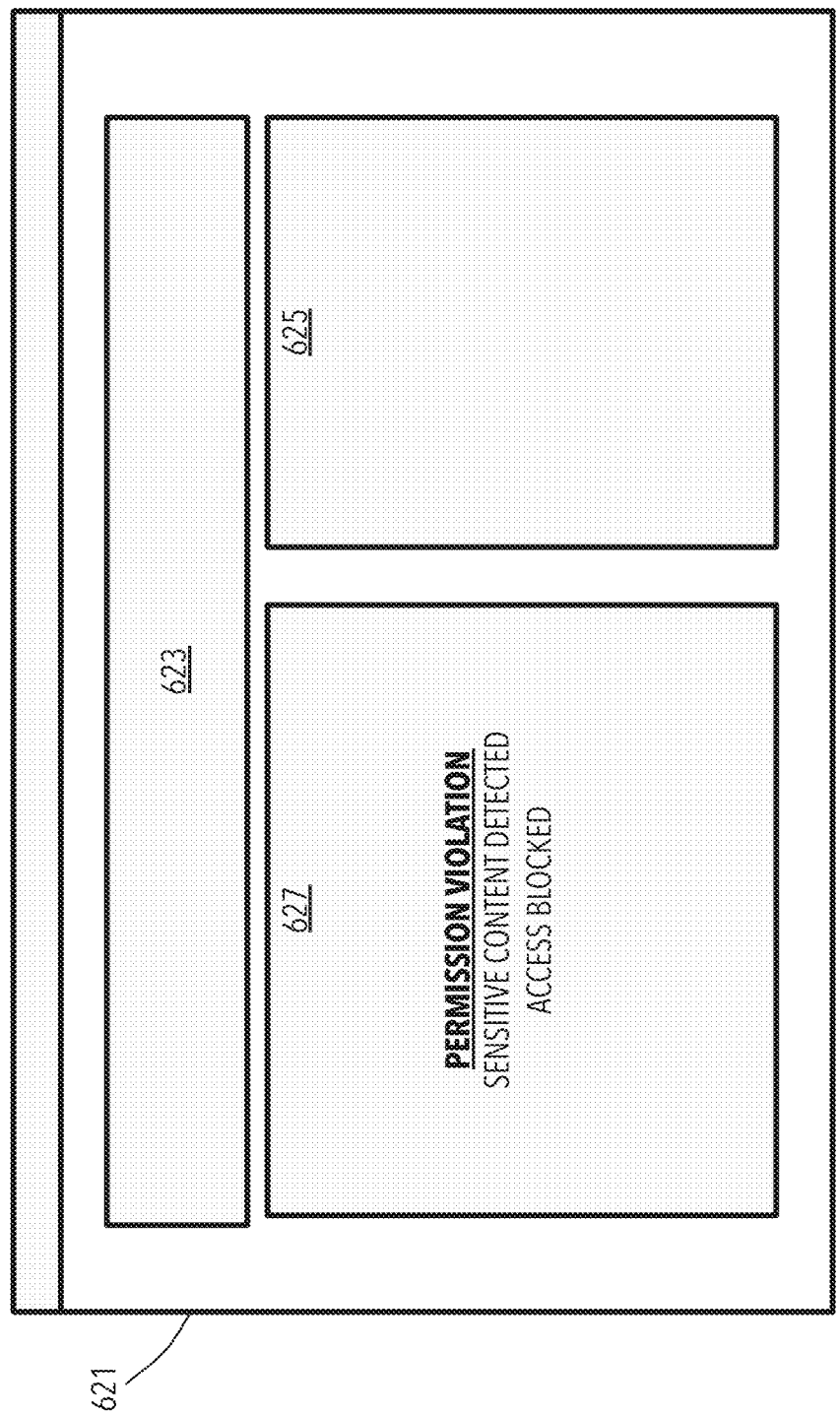

At block 352, the system transmits the modified set of media instructions to the user browser. Using the modified media instructions, the user browser renders the web page requested by the user's selection at block 317. For example, FIG. 6C illustrates a picture of an example web page 621, including content 623, 625, and 627, transmitted to the user browser at block 371. Because of the media instructions determined at block 351 and the replacing of the subset of content, the content 627 has been replaced with a notification that the portion of the content requested at block 321 violates permissions, so the access is blocked to the user.

While the above example describes the process 300 restricting content transmitted downstream from the remote browser to the user browser, those in the relevant arts will understand that the process may also perform the same or similar operations for upstream information transmitted from the user browser to the remote browser. For example, the server may prevent upstream transmission of confidential, personal, or malicious information.

4. Example Embodiment of Modifying Content from a Remote Browser

Figure 4:
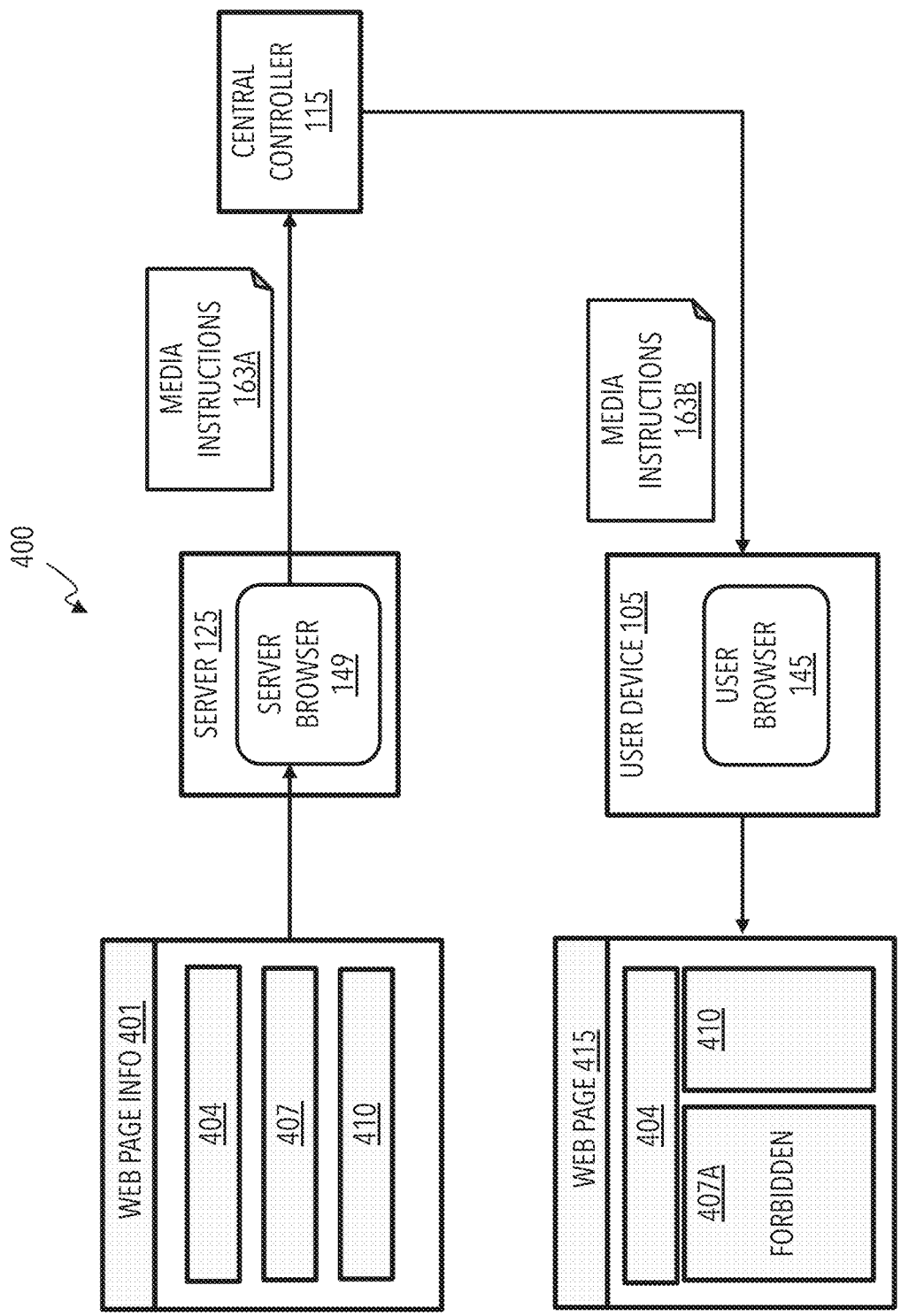
FIG. 4 shows a functional flow block diagram illustrating an example of a process in accordance with one or more embodiments.
Figure 5:
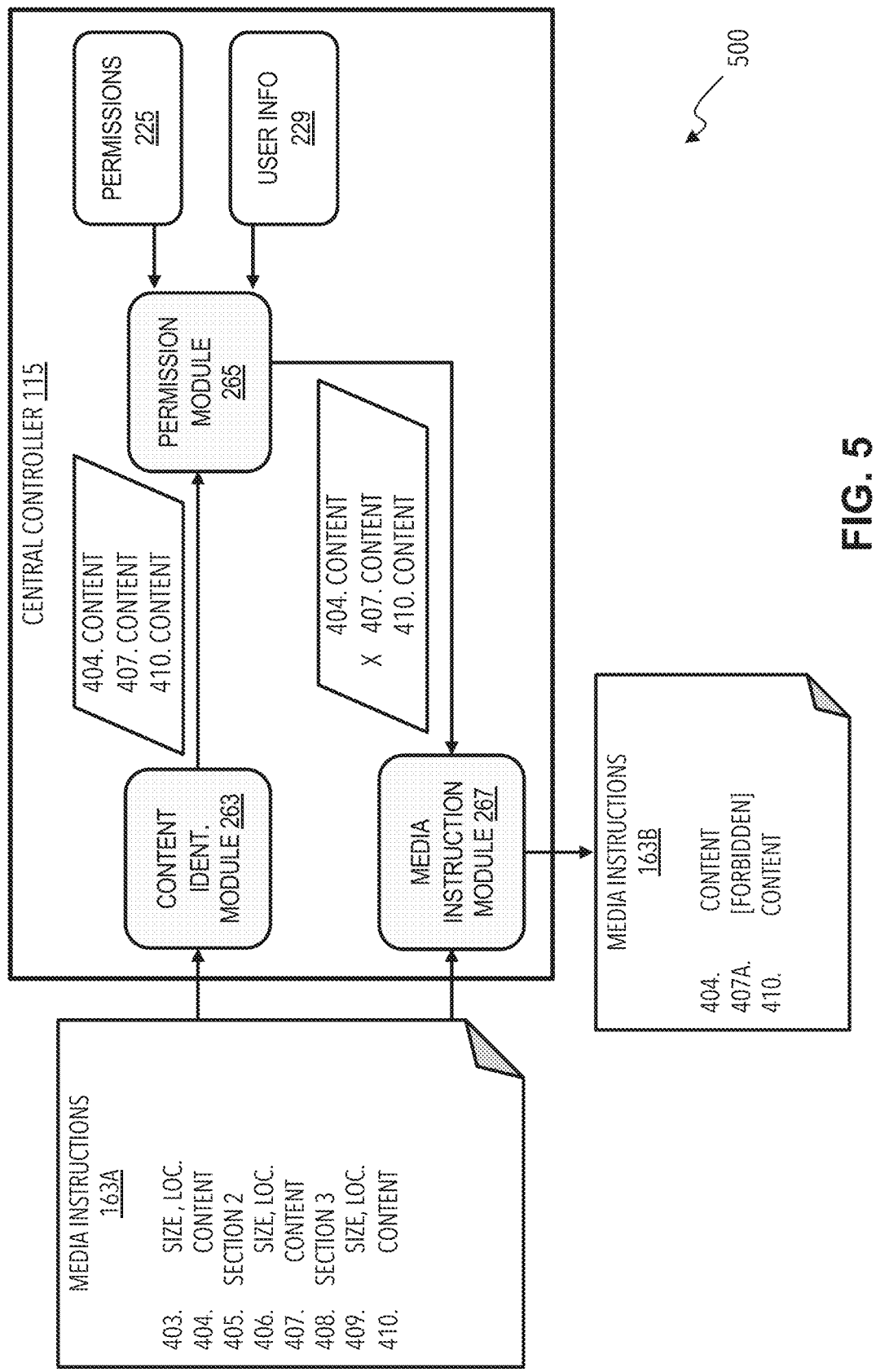
FIG. 5 shows a functional flow block diagram illustrating an example of a process in accordance with one or more embodiments.

FIGS. 4 and 5 illustrate examples for purposes of clarity. Components and/or operations described below should be understood as specific examples that may not be applicable to certain embodiments. Accordingly, components and/or operations described below should not be construed as limiting the scope of any of the claims.

FIG. 4 shows a functional flow block diagram 400 illustrating an example of a process that transmits requested content in accordance with one or more embodiments. The flow block diagram 400 includes user device 105, central controller 115, server 125, user browser 145, and remote browser 149; each can be the same or similar to those described previously above. The remote browser 149 receives web page information 401 (e.g., content information 161) including content 404, 407, and 410 from a content source (e.g., content repository 135). The remote browser 149 sanitizes the web page information 401 to identify and remove unpermitted information or other security threats. Additionally, the remote browser 149 determines media instructions 163A for rendering the web page information 401 into a web page and forwards the media instructions 163A to the central controller 115.

The central controller 115 receives the media instructions 163A to identify the content 404, 407, and 410. The central controller 115 also determines if the user lacks permission to access any subset of the content 404, 407, and 410 that are included in the media instructions 163A. Based on determining that the user lacks permission to access content 407, the central controller 115 refrains from transmitting content 407 to the user device 105. Using the information included in the media instructions 163A, the central controller 115 renders modified media instructions 163B, including the content 404 and 410, while excluding the unpermitted content 407. Additionally, when modifying the media instructions, the central controller 115 replaces the unpermitted content 407 with content 407A, including a notification that the content 407 is forbidden and blocked to the user.

FIG. 5 shows a functional flow block diagram illustrating example of a processes performed by the central controller 115 in accordance with one or more embodiments. The central controller 115 includes a content identification module 263, a permission module 265, and a media instruction module 267. The content identification module 263, the permission module 265, and the media instruction module 267 may be the same or similar to those previously described above. As illustrated in FIG. 5, the content identification module 263 may receive media instructions 163A. The media instructions 163A may be a structured data file for rendering a web page (e.g., web page 415) including content 404, 407, and 410. The content 404, 407A, and 410 may contain, for example, text, program code, documents, advertisements, images, video, audio, music, data files, and hyperlinks to such information. The content identification module 263 processes the media instructions 163A to identify and process the content 404, 407, and 410 and provide the content to the permissions module 265. For example, the content identification module 263 may render a web page based on the media instructions 163A and scrape the web page for the content 404, 407, and 410. Scraping the web page may include using one or more optical character recognition (OCR) modules, image recognition modules, voice recognition modules, etc. to translate the content 404, 407, and 410 into computer-readable formats.

The permissions module 265 interprets and analyzes the content for violations using permissions 225 and user information 229. As shown in FIG. 5, the permissions module 265 identifies restricted content 407 as violating the permissions 225 (as indicated by the "X"), whereas content 404 and 410 do not violate permissions. Based on the output of the permission module 265, the media instruction module 267 generate modified media instructions 163B that includes content 404 and 410 and excludes content 407. As described above, the media instruction module 267 generate the modified media instructions 163B by including content 407A that replaces content 407 to indicate that content 407 is unpermitted and blocked to the user. For example, the permissions 225 may include policy that any document containing social security numbers should not be downloaded. By applying this policy to the content 404, 407, 410, the permissions module 265 determines that content 407 includes social security numbers in violation of this policy, whereas content of content elements 404 and 410 do not include social security numbers. Based on the determination made by the permission module, the media instruction module 267 generate the modified media instructions 163B excluding the content 407 and, in one or more embodiments, replace the content 407 with different content 407A such as a notification. Thus, the central controller 115 prevent an end-user's attempt to download a document (e.g., web page 401), or portions thereof, including social security numbers.

Those in the relevant arts will understand that other examples may perform similar operations to those above when processing information, content, and user inputs transmitted from a local browser. For example, based on the output of the permission module 265, the central controller 115 (e.g., executing content request module 266) may generate modified content requests (e.g., content requests 159) from upstream information from a user device (e.g., upstream information 155 generated by user browser 145 of user device 145). The central controller 115 may generate the modified content requests redacting unpermitted information. For example, the permissions 225 may include a policy that any document containing social security numbers should not be uploaded. By applying this policy to the content request, the permissions module 265 may determine that the upstream information includes social security numbers, in violation of the policy, causing the central controller 115 to generate the modified content request that redacts the unpermitted information. Additionally, the content request module 266 can modify or enhance the unpermitted information to, for example, indicate the redaction.

5. System Architecture for Secure Access via a Remote Client

Figure 7:
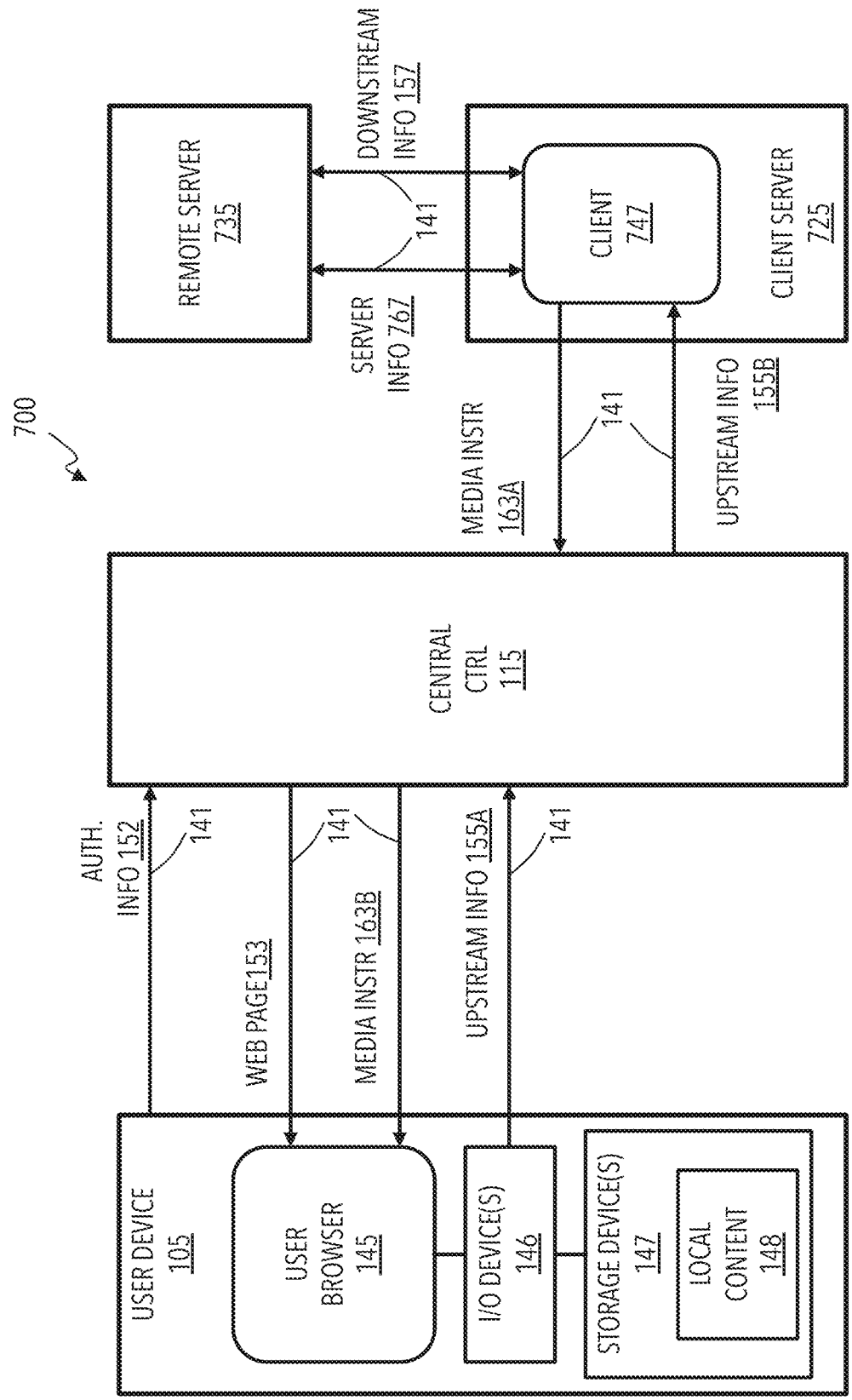
FIG. 7 shows a system block diagram illustrating an example of an environment for implementing systems and processes in accordance with one or more embodiments.

FIG. 7 shows a block diagram illustrating an example of an environment 700 that implements and processes systems in accordance with other aspects of the present disclosure. The environment 700 includes a user device 105, a central controller 115, and communication channels 141 that may be the same or similar to those previously described above.

Additionally, the environment 700 includes a client server 725 and a remote server 735 that may be the same or similar to the servers previously described (e.g., server 125 and/or repository 135). The client server 725 is one or more computing devices communicatively linked between the central controller 115 and the remote server 735 by one or more of the communication channels 141. The client server 725 executes a client application ("client") 747 that generates and updates an interactive user interface for controlling hardware, services, applications, content, data, etc. using the remote server 735. The user interface may be for an operating system (O/S), a relational database management system (RDBMS), a virtual data center (VDC) environment, or the like. For example, the client 747 may be an SSH client. SSH is a cryptographic network protocol used for securely communicating with remote systems such as the remote server 735. A SSH client generates a shell interface for the user to interact with a browser such as user browser 145 at the user device 145. Some embodiments of the client 747 may be a Structured Query Language (SQL) client of the RDBMS. An RDBMS stores data in tables. A user can manage and manipulate the tables using SQL. A SQL client is a user interface that allows users to interact with the RDBMS tables. Using the SQL client, the user can send SQL queries to the RDBMS to receive or modify data in the tables. Additionally, some embodiments of the client 747 can be a VDC client. A VDC is a pool of computing resources, such as virtual machines, storage, and a network implemented using physical hardware. A VDC client is a user interface allowing the user to manage and interact with resources within a VDC environment implemented and/or maintained by the remote server 735.

A user of the user device 105 interacts with the client 747 via the central controller 115 using the user browser 145 and the I/O devices 146 to obtain downstream information 157 from the remote server 735. Using media instructions 163A for rendering a user interface from the client 747, the central controller 115 generates media instructions 163B for rendering an image representing the user interface by the user browser 145 including a representation of permitted downstream information 157. The user interface at the user browser 145 mimics the user interface of the client 747 for interacting with the remote server 735. The user interface represents graphic user interface elements, such as command entry lines, tables, lists, hyperlinks, radio buttons, drop down menus, scroll bars, etc. that the user browser 145 uses to present the permitted downstream information 157. The user interface presents information to the user visually, audibly, and/or tactilely using the I/O devices 146.

The user can view and interact with the graphic user interface elements presented in a web 152 and upstream information 155A using the I/O devices 146. The user may input and output information using one or more techniques, including accessing information on a storage device communicated visually, audibly, and/or tactilely. The central controller 115 may receive the control inputs to the I/O devices 146 by detecting user inputs to the user browser 145.

The user browser 145 communicates authentication information 152 and upstream information 155A to the central controller 115. The authentication information 152 includes login credentials, geolocation data, biometric information, etc. input by the user using an I/O device (e.g., a keyboard, fingerprint reader, retina scanner, etc.), cryptographic security key, or the like. Using the authentication information 152 and other contextual limitations (e.g., user behavior patterns), the central controller 115 authenticates the identity and location of the user. Responsive to successful authentication, the central controller 115 determines user profile information, including permissions, rules, authorizations, constraints, exclusions, etc. For example, based on the user profile, the central controller 115 determines that the user is permitted to access the client server 725 and/or the remote server 735.

The upstream information 155A includes control information, such as user inputs to I/O devices 146, and content such as local content 148. For example, the user browser 145 may generate control information by tracking X-Y positions of a mouse pointer selections in a representation of the client's 747 user interface rendered at the user device 105. In response to the upstream information 155A received from the user device 105, the central controller 115 transmits upstream information 155B to the client 747 at the server 725. Some embodiments of the central controller 115 selectively block or limit upstream transmission of information from the user device 105 to the client 747 and the remote server 735 by applying appropriate policies or permissions. For example, the central controller 115 may prevent communication of content or control inputs from the user device 105 comprising confidential or personally identifiable information.

In response to the upstream information 155B, the client 747 executes the control inputs at the remote server 735. The executing includes performing commands and operations triggered by the control inputs. For example, the control inputs may include code for executing a SQL query on a DBMS at the remote server 735. The client 747 exchanges server information 767 with the remote server 735. The server information 767 includes information from the client 747 generated using the control inputs. In response to the server information 737, the client 747 receives downstream information 157 form the remote sever 735. The downstream information 157 includes content generated by the remote sever 735 based on server information 767 received from the remote server 735. For example, the content in downstream information 157 includes files, audio, video, images, data, and/or text for presentation in a user interface generated by the client 747.

Using the downstream information 157 generated by the remote server, the client 747 determines media instructions 163A to generate a user interface including the content of the downstream information 157. For example, media instructions 163A may be graphical instructions such as DrawRect, DrawImage, DrawText at given coordinates, move cursor, etc.

The client server 725 communicates the media instructions 163A, including the content of the downstream information 157, to the central controller 115. The central controller 115 analyzes the content included in the media instructions 163A to determine if the user is permitted to access the entire content or a subset of the content. The central controller 115 determines if the user is permitted to access the content based on the user's profile information, permissions, and context. For example, the user profile information may define locations, time frames, device information, and behavioral patterns used to determine the user's permission to access to the content. Also, determining permission to access the content by the user may be based on metadata describing the content's source, type, classification (e.g., classified, confidential, proprietary, etc.), subject matter, text, audio, and images. Permission to access the content may also be determined based on the content itself, including text data and image data included in the content. For example, the central controller 115 identifies unpermitted content using a machine learning model or a bag-of-words search of the content and metadata of the content to identify terms or combinations of terms included in the content. Additionally, one or more embodiments of the central controller 115 maintain a library of information identifying sources, types, classification, text, and images that are not permitted.

In response to determining that the user lacks permission to access at least a subset of the content, the central controller 115 generates modified media instructions 163B and transmit the media instructions 163B to the user device 105 for rendering a representation of the user interface by the user browser 145. Modifying the media instructions 163A for rendering the user interface may include altering the media instructions 163A to remove elements corresponding to the unpermitted content. Additionally, modifying the media instructions 163A may include replacing the elements corresponding to the unpermitted content with modified content such as instructions to display notification. Further, modifying the media instructions 163A may include augmenting the content such as by adding watermarks. The user browser 145 receives the modified media instructions 163B and generates a representation of the user interface of the client 747 such that the user device 105 displays the user interface without a user viewing or accessing any unpermitted content transmitted in the downstream information 157.

While the above example describes the central controller 115 analyzing and limiting downstream information 157 from the server 735, those in the relevant arts will understand that the central controller 115 can also perform the same or similar operations for upstream information 155A from the user device 105. For example, in response to receiving upstream information 155A, the central controller 115 analyzes content included in the upstream information 155A, such as local content 148, to determine if the user is permitted to share some or all of the content to prevent upstream transmission of confidential, personal, or malicious information from the user device 105. In response to determining that the user lacks permission to share at least a subset of the content, the central controller 115 generates modified upstream information 155B, excluding the unpermitted content, and transmit the modified upstream information 155B to client 747 at the client server 725.

While the central controller 115, the client server 725, and the remote server 735 are illustrated in FIG. 7 as separate systems, one or more embodiments combine some or all of the functionality into a single system or divide the functionality among more systems. For example, one or more embodiments of the client server 725 include functionality of the remote server 735. Also, in one or more embodiments, a single system include the functionality of the user device 105 and the central controller 115, and/or a single system include the functionality the client server 725 and the remote server 735.

6. Restricting and Modifying Content from a Remote Client

The flow diagrams in FIGS. 8A, 8B, 8C, and 8D illustrate examples of the functionality and operation of possible implementations of systems, methods, and computer program products according to various implementations consistent with the present disclosure. Each block in the flow diagrams of FIGS. 8A, 8B, 8C, and 8D represent a module, a segment, or a portion of program instructions that include one or more computer executable instructions for implementing the illustrated functions and operations. In some alternative implementations, the functions and/or operations illustrated in a particular block of the flow diagram may occur out of the order shown in FIGS. 8A, 8B, 8C, and 8D. For example, two blocks shown in succession may be executed substantially concurrently, or the blocks may be executed in the reverse order, depending upon the functionality involved. Each block of the flow diagram and combinations of blocks may be implemented by special purpose hardware-based systems that perform the specified functions or acts or combinations of special purpose hardware and computer instructions.

FIGS. 8A, 8B, 8C, and 8D show a process flow block diagram 800 illustrating an example of a process for intercepting and modifying content exchanged between a user device and a client application in accordance with one or more embodiments. At block 803 of FIG. 8A, a system receives user authentication information from a user device. For example, the system may generate a login web page in a user browser for inputting authentication information in response to the user triggering a hyperlink displayed by the user browser at the user device. The authentication information includes a substantially unique identifier of the user and a security credential, such as a token, a passcode, a biometric identifier, etc.

At block 811, the system authenticates the user. The system performs the authentication by verifying the user identity and security credentials. The authentication also includes determining a current context for the user's access and if the user is authorized to access the central controller 115 in the determined context. Determining the context includes determining if the current context corresponds to the user's past behavior patterns based on, for example, permissions, user information, and user behavior information. Additionally, the system determines the context based on the location of the user device and the device profile (e.g., make, OS version, device type, etc.). The geolocation information may be determined by the user device based on, for example, global positioning system data. The geolocation information may also be estimated by the system based on an Internet Protocol address of the user device or using a similar technique.

At block 815, based on successful authentication of the user at block 811, the system transmits a dashboard to the user device. The dashboard may display systems and services authorized for the particular user based on the authentication at block 811. One or more embodiments display the dashboard using a browser application. For example, the dashboard may be the same or similar to that previously described regarding FIG. 6A and include one or more selections corresponding to clients of remote servers. The client applications may be, for example, one or more of an SSH client, a VDC client, and a RDBMS client.

At block 817, the system receives one or more user inputs selecting the client of the remote server from the dashboard displayed at user device at block 815. Receiving the selection includes receiving control information. For example, the user browser application may receive user interface inputs, such as mouse clicks and keyboard entries that interact with the dashboard. The user browser transmits the control inputs indicating a selection from the dashboard.

At block 819, the system determines if the user is permitted to access the remote server selected at block 817. The system determines the user's access based on a user's permissions, contextual limitations, the user's current context, and user inputs, as previously described above. If the user is not permitted to access the remote server (e.g., block 819 is "No"), then the system, continuing to block 865 in FIG. 8D via off-page connector "A", transmits a notification to the user browser indicating access to the remote server is forbidden. On the other hand, if the system determines the user is permitted to access the remote server (e.g., block 819 is "Yes"), then at block 821, the system receives media instructions transmitted from the client representing the user interface of the client resulting from the access permitted at block 819. At block 825, the system transmits the media instructions to the end-user device for displaying the user interface. Using the media instructions, the user browser renders a representation of the client's user interface.

At block 827, the system receives upstream information from the user browser. The upstream information includes control inputs input by the user to the user interface rendered by the user browser using the media instructions transmitted at block 825. The user inputs control the client by interacting with the graphic user interface (GUI) element displayed by the locally rendered web page, such as entering commands and information into a command line of a mimicked client user interface. The upstream information also included content, such as text, files, data, images, audio, etc.

At block 829, the system determines if upstream information received at block 827 should be restricted or modified. As previously described, the system analyzes upstream information using policies or permissions to prevent transmission of confidential, personal, or malicious information. The analysis determined if the upstream information should be blocked, restricted, or permitted. If the system determines the upstream information is at least partially restricted (e.g., block 829 is "Yes"), then the process 800 proceeds to block 853 in FIG. 8C, as indicated by off-page connector "B" described below. If the system determines the upstream information is not restricted (e.g., block 829 is "No"), then the process 800 proceeds to block 831.

At block 831, the system transmits the upstream information received at block 827 to the client for mimicking the user inputs received at the client. The interactions with the browser at the user device may be performed by the client at the client server. In some embodiments, the system updates the user browser and client such that they substantially mirror one another by mimicking a user interface, including GUI elements, content, interactions, animations, etc. throughout the process 800.

Figure 8A:
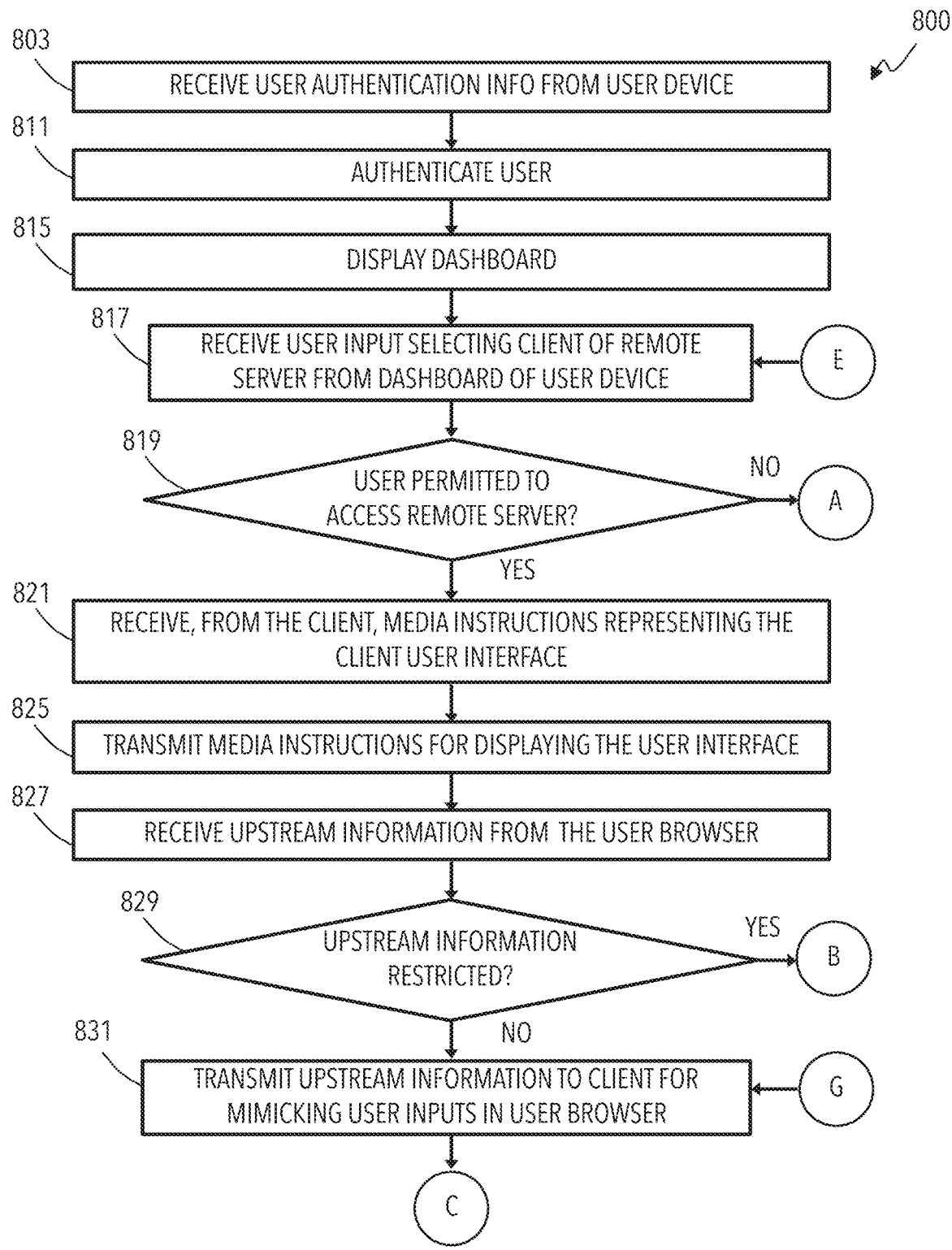
FIGS. 8A, 8B, 8C, and 8D show a process flow block diagram illustrating an example of a process in accordance with one or more embodiments.
Figure 8B:
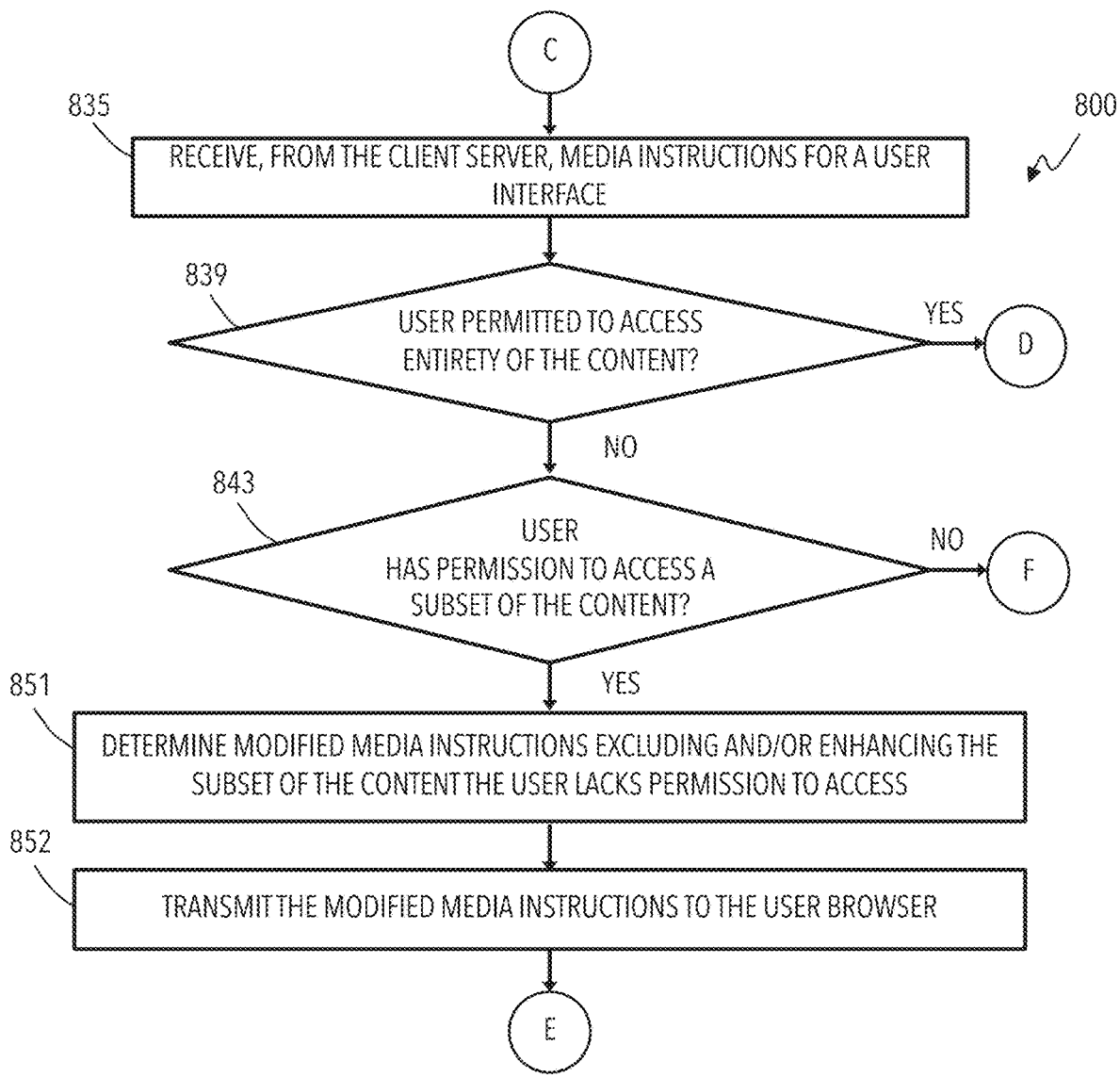

Continuing to FIG. 8B as indicated by off-page connector "C," at block 835, the system receives media instructions for a user interface from the client. The media instructions may include content generated by the remote server in response to the upstream information received by the client from the user's browser and then executed by the client on the remote server. For example, the content includes text, tables, or other information returned from an O/S, RDBMS, or VDC at the remote server.

At block 839, the system determines if the user is permitted to access an entirety of the content received at block 835. As previously described, the system determines if content is permitted based on user information, permissions, and behavior patterns. For example, the system may determine the user lacks permissions to accesses the certain content based on a user's job title. Also, the system may determine the user lacks permissions to access the content based on the user's current context (e.g., time, location, device, etc.) being anomalous from their usual pattern of behavior for accessing the proprietary content from their work location during normal business hours.

Figure 8C:
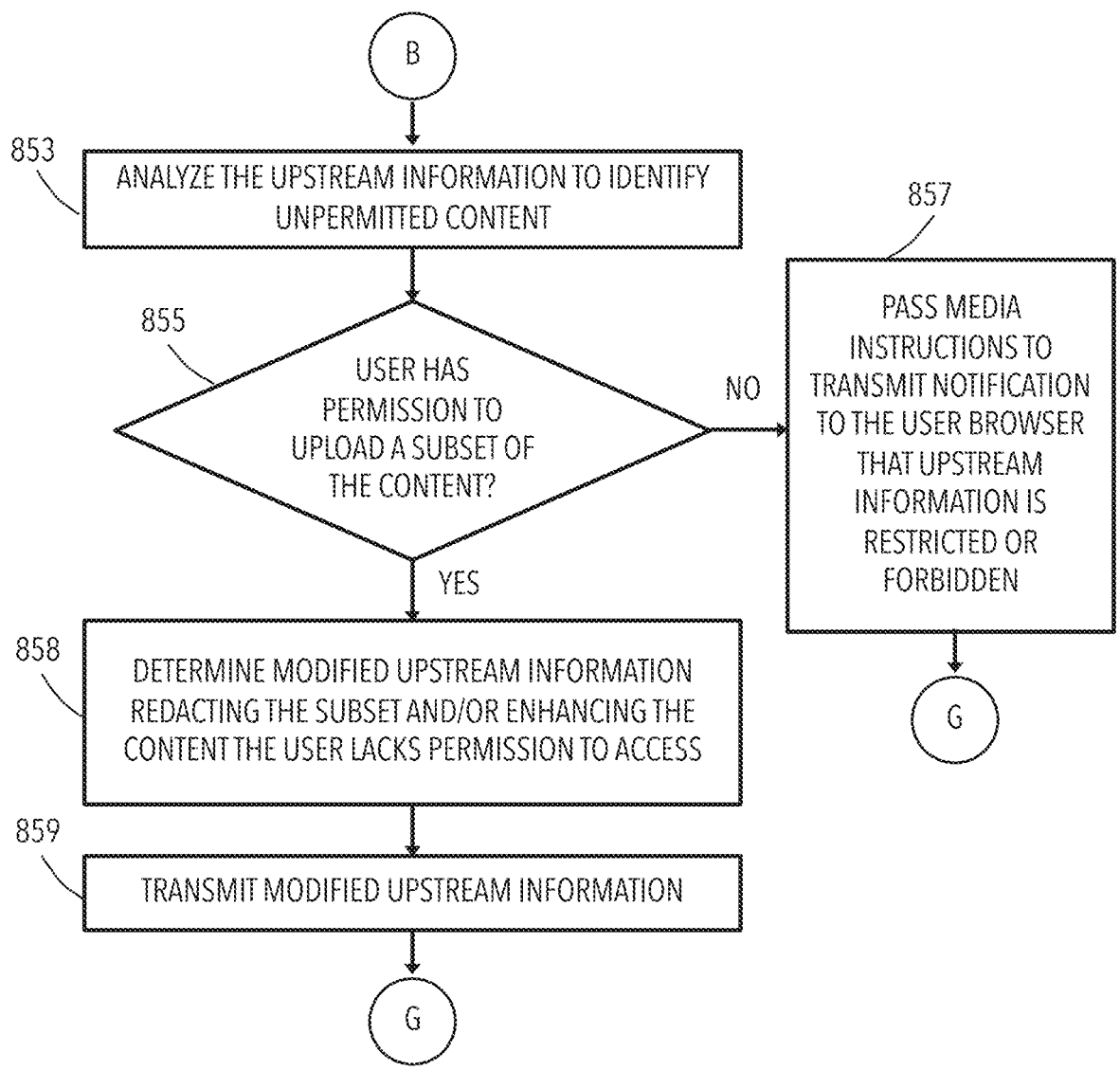
Figure 8D:
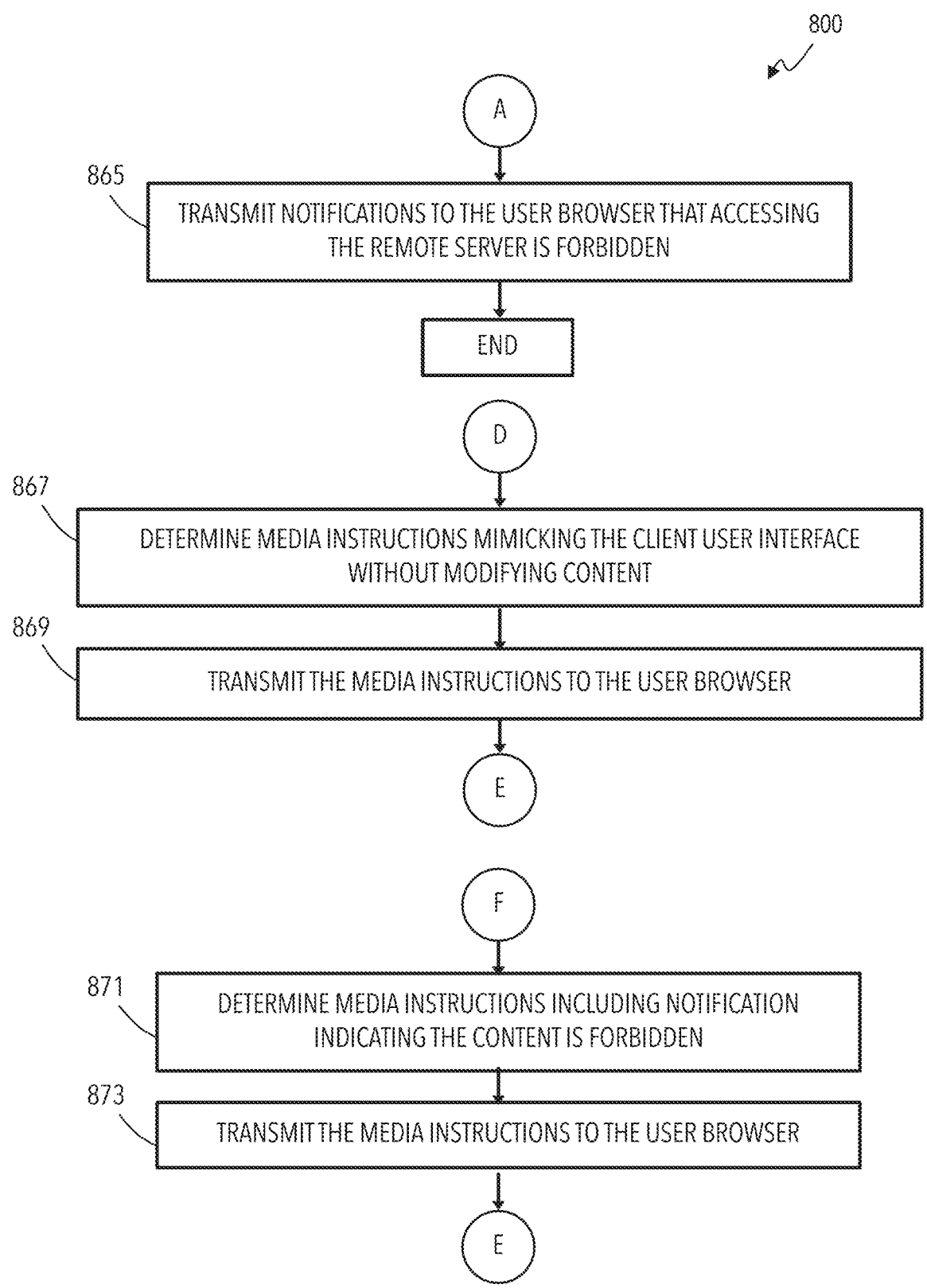

At block 839, if the user is permitted to access the entirety of the content (e.g., block 839 is "Yes"), then continuing to FIG. 8D via off-page connector ("D"), at block 867, the system determines media instructions for generating a user interface mimicking the client user interface without modifying the content received from the client. At block 869, the system transmits the Some embodiments may then return to block 817 of FIG. 8A as indicated by off-page connector "E."

On the other hand, at block 839, if the system determines the user is not permitted to access the entirety of the content (e.g., block 839 is "No"), then at block 843, the system determines if the user has permission to access at least a subset of the content. The system identifies a subset of the content that the user lacks permission to access. For example, the system may determine the user lacks permission to access a subset of the content included that is highly confidential business information based on the permissions and the user's job title. Also, the system may determine the user lacks permission to accesses a subset of the content that is proprietary based on the user's current context (e.g., time, location, device, etc.) being anomalous from their usual pattern of behavior for accessing the proprietary content from their work location during normal business hours.

Figure 3D:
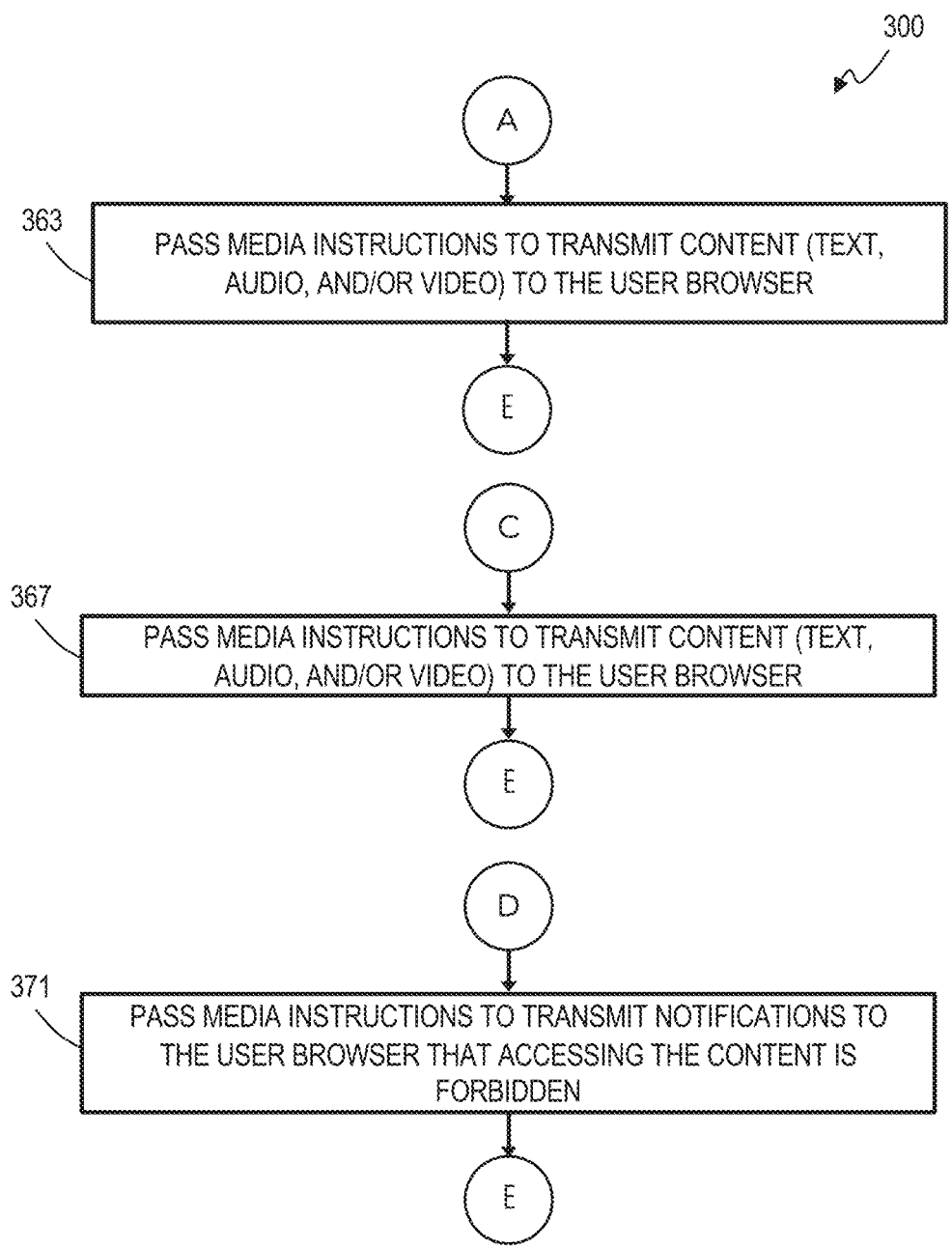

At block 843, if the user lacks permission to access any of the content (e.g., block 843 is "No"), then at block 871 in FIG. 3D, as indicated by off-page connector ("F"), the system determines media instructions including a notification that the content is forbidden. The media instructions may substantially mimic the client user interface, as displayed when the most recent upstream information was transmitted at block 823 updated, except that the notification replaces the content. At block 873, the system transmits the media instructions to the user for rendering by the browser at the user device. For example, similar to FIG. 6B, the media instructions generate a web page, including a notification 613, that indicates the content generated in response to the upstream information violates permissions, so the access is blocked to the user. Some embodiments may then return to block 817 of FIG. 8A as indicated by off-page connector "E."

If, at block 843, the user has permission to access a subset of the content (e.g., block 843 is "Yes"), at block 851, the system determines modified media instructions excluding the subset of the first content that the user lacks permission to access. Determining the media instructions includes replacing the subset of the content identified at block 843. In some implementations, modifying the media instructions removes the unpermitted content. In other implementations, modifying the media instructions replaces the subset of content. Some embodiments replace the subset of the content with a notification that indicate that the subset of the content is not permitted. Some embodiments augment the subset of the content with a information, such as a watermark, indicating that the subset of the content is restricted.

For example, similar to the embodiment illustrated by the functional flow block diagram in FIG. 5, the central controller 115 receives media instructions 163A from the client. The media instructions 163A may be a structured data file for rendering a user interface of the client, including content 404, 407, and 410. The central controller 115, using content identification module 263, processes the media instructions 163A to identify and process the content 404, 407, and 410, and provide the content to the permissions module 265. The content identification module 263 may render the client user interface based on the media instructions 163A and scrape the user interface for the content 404, 407, and 410. Scraping the user interface includes using one or more optical character recognition (OCR) modules, image recognition modules, voice recognition modules, etc. to translate the content 404, 407, and 410 into computer-readable formats. The permissions module 265 interprets and analyzes the content for violations using permissions 225 and user information 229. As shown in FIG. 5, the permissions module 265 identifies restricted content 407 as violating the permissions 225 (as indicated by the "X"), whereas content 404 and 410 do not violate permissions. Based on the output of the permission module 265, the media instruction module 267 generates modified media instructions 163B including content 404 and 410 and excluding content 407. Additionally, as described above, the media instruction module 267 generates the modified media instructions 163B by including content 407A that replaces content 407, indicating that content 407 is unpermitted and blocked to the user. For example, the media instruction module 267 may generate the modified media instructions 163B excluding the content 407, and in one or more embodiments, replace the content 407 with different content 407A such as a notification.

At block 852, the system transmits the modified media instructions to the user browser at the user device. Using the modified media instructions, the user browser renders the content requested by the upstream instructions transmitted at block 825. The media instructions generate a user interface mimicking the client user interface including content transmitted to the client in downstream information from the remote server at block 835. Based on the modified media instructions determined at block 851, the user interface at the browser replaces the subset of content with a notification that the portion of the content violates permissions and the access is blocked to the user.

Referring back to block 829 of FIG. 8A, if the system determines that upstream information from the user device is restricted, then continuing to block 853 of FIG. 8C as indicated by off-page connector "B," the system analyzes the upstream information to identify the unpermitted content. As previously described, the system determines if content is permitted based on user information, permissions, and behavior patterns. For example, the system determines the user lacks permissions to share certain content, information, accounts, or devices based on a user's job title and associated permissions. Also, the system determines if the user lacks permissions to share certain content, information, accounts, or devices based on the user's current context (e.g., time, location, device) being anomalous from their usual pattern of behavior for accessing the proprietary content from their work location during normal business hours. Further, the system determines if certain types of content, such as confidential or personally identifiable information, are restricted.

At block 855, the system determines if the user is permitted to upload a subset of the content based on the analysis at block 853. If not (e.g., block 855 is "No"), then at block 857, the system passes media instructions to transmit a notification to the user browser that upstream information is restricted or forbidden. Some embodiments may then return to block 831 as indicated by off-page connector "G." On the other hand, if the user is permitted to upload a subset of the content (e.g., block 855 is "Yes"), then at block 858, the system determines a modified upstream information redacting the forbidden subset and/or enhancing the content that the user lacks permission to access. At block 859, the system transmits the modified upstream determined at block 858 and returns to block 831 as indicted by off-page connector "G."

7. Hardware Overview

According to one embodiment, the techniques described herein are implemented by one or more special-purpose computing devices. The special-purpose computing devices may be hard-wired to perform the techniques, or they may include digital electronic devices, such as one or more application-specific integrated circuits (ASICs), field programmable gate arrays (FPGAs), or network processing units (NPUs) that are persistently programmed to perform the techniques. Furthermore, the special-purpose computing devices may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 9:
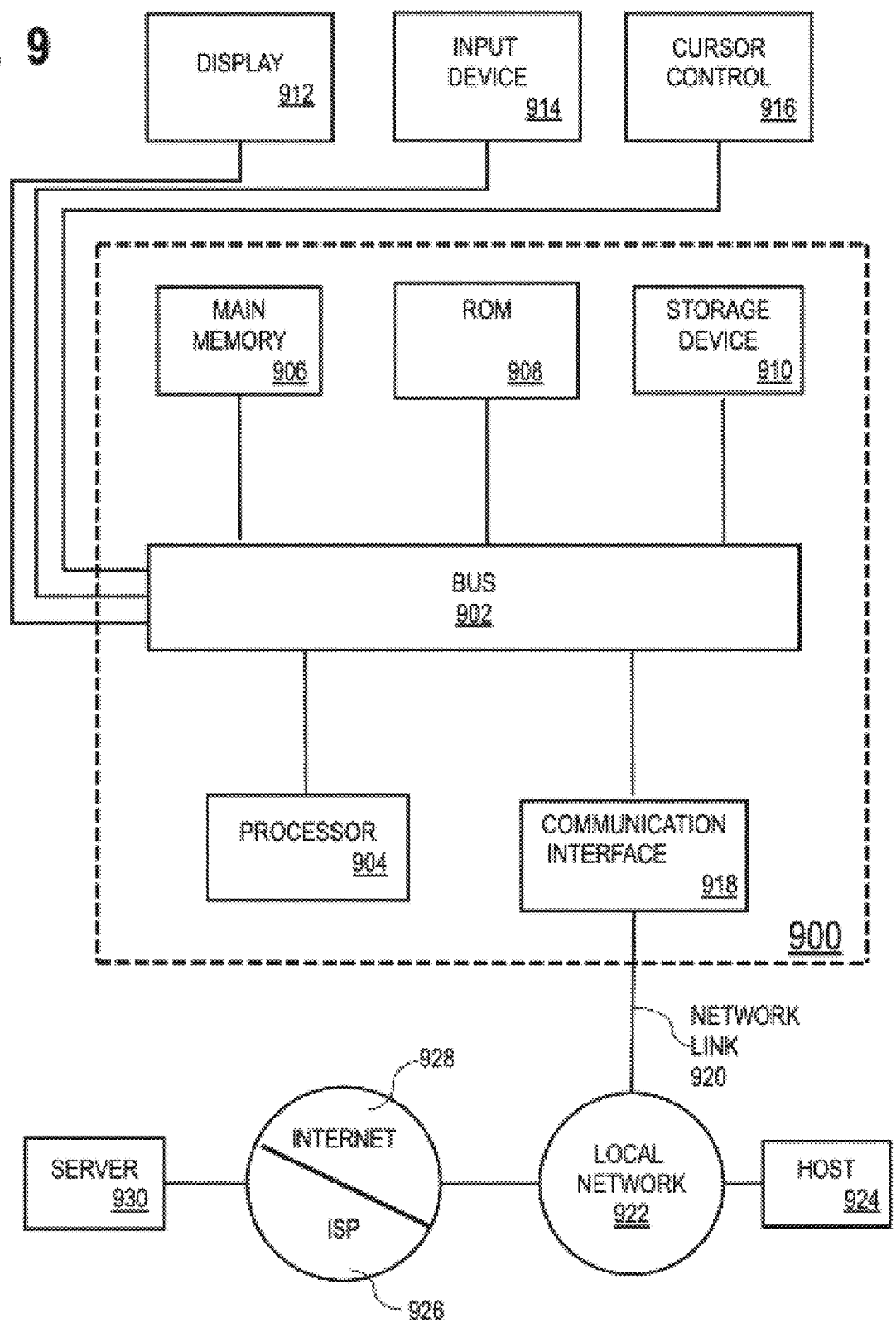
FIG. 9 shows a block diagram that illustrates a computer system in accordance with one or more embodiments.

For example, FIG. 9 is a block diagram that illustrates a computer system 900 that embodiments may be implemented on. Computer system 900 includes a bus 902 or other communication mechanism that communicates information as well as a hardware processor 904 coupled with bus 902 that processes information. Hardware processor 904 may, for example, be a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 as well as for controlling cursor movement on display 912. This input device typically has two degrees of freedom in two axes, a first axis (e.g., x) and a second axis (e.g., y) that allow the device to specify positions in a plane.

Computer system 900 may implement the techniques described herein using customized hard-wired logic, one or more ASICs or FPGAs, firmware, and/or program logic that in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium such as storage device 910. Executing the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks such as storage device 910. Volatile media includes dynamic memory such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 902. Transmission media also includes acoustic or light waves such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 may receive the data on the telephone line and use an infra-red transmitter to convert the data to an infra-red signal. An infra-red detector may receive the data carried in the infra-red signal, and appropriate circuitry may place the data on bus 902. Bus 902 carries the data to main memory 906 for retrieval and execution by the that processor 904. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem that provides a data communication connection to a corresponding type of telephone line. As another example, communication interface 918 may be a local area network (LAN) card that provides a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. In turn, ISP 926 provides data communication services through the worldwide packet data communication network now commonly referred to as the "Internet" 928. Local network 922 and Internet 928 both use electrical, electromagnetic, or optical signals that carry digital data streams.

Computer system 900 may send messages and receive data, including program code, through the network(s), network link 920, and communication interface 918. In the Internet example, a server 930 might transmit a requested code for an application program through Internet 928, ISP 926, local network 922, and communication interface 918. The received code may be executed by processor 904 as the code is received and/or stored in storage device 910 or other non-volatile storage for later execution.

8. Miscellaneous; Extensions

Embodiments are directed to a system with one or more devices that include a hardware processor and that are configured to perform any of the operations described herein and/or recited in any of the claims below. In an embodiment, a non-transitory computer readable storage medium comprises instructions that when executed by one or more hardware processors causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form such claims issue in, including any subsequent correction.

With respect to the use of any plural and/or singular terms herein, those having skill in the art may translate from the plural to the singular and/or from the singular to the plural as is appropriate to the context and/or application. The various singular/plural permutations may be expressly set forth herein for sake of clarity.

Those in the relevant arts will understand that in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Those in the relevant arts will also understand that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, such phrases should not be construed to imply the introduction of a claim recitation by the articles "a" or "an" limits any claim to implementations containing a single such recitation. Even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense that one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense that one having skill in the art would understand the convention (e.g., "a system having at least one of A, B, or C" would include but not be limited to systems that have A alone, B alone, C alone, A and B together, A and C together, B and C together, and/or A, B, and C together, etc.). Those in the relevant arts will understand that virtually any disjunctive word and/or phrase presenting two or more alternative terms, if in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A non-transitory computer readable medium comprising instructions that, when executed by one or more hardware processors, causes performance of operations comprising:
   receiving, from a client application, a first set of information for a user interface of a software application executed at a remote server, wherein the first set of information includes first content to be presented to a user of the client application;
   determining that the user lacks permission to access at least a subset of the first content based on permissions for the user;
   responsive to determining that the user lacks permission to access at least the subset of the first content, modifying the first content to remove at least the subset of the first content to generate a modified first content;
   generating a first set of media instructions for a user browser, the first set of media instructions including the modified first content; and
   transmitting, to the user browser at a computing device of the user, the first set of media instructions, wherein the first set of media instructions represent the user interface including the modified first content.

2. The medium of claim 1, wherein modifying the subset of the first content the comprises:
   excluding at least the subset of the first content based on the permissions.

3. The medium of claim 2, wherein, responsive to determining that the user lacks permission to access at least the subset of the first content, the operations further comprise:
   transmitting a notification to the user browser that accessing the subset of the first content is forbidden.

4. The medium of claim 1, wherein the operations further comprise:
   receiving, from the computing device of the user, control inputs to the user browser; and
   transmitting the control inputs to the client application.

5. The medium of claim 1, wherein the operations further comprise:
   receiving user content from the user browser;
   based on the permissions, modifying at least a subset of the user content; and
   transmitting the modified user content to the client application.

6. The medium of claim 1, wherein the operations further comprise:
   identifying the first content by scraping the first content from the first set of information.

7. The medium of claim 1, wherein the operations further comprise:
   receiving from the client application, a second set of information for the user interface, wherein the second set of information includes second content to be presented to the user of the client application;
   based on the permissions, determining that the user is authorized to access an entirety of the second content;
   generating a second set of media instructions for the user browser, the second set of media instructions including the second content; and
   transmitting, to the user browser at a computing device of the user, the second set of media instructions, wherein second set of media instructions represent the user interface including the second content.

8. The medium of claim 1, wherein:
receiving the first set of information comprises receiving the first set of information from a client server communicatively connected to the remote server; and
the first set of information includes content from the remote server and user interface information from the client.

9. The medium of claim 1, wherein determining the permissions is based on one or more of: permissions of the user, behaviors of the user, context of a user device, and anomalous pattern associated with data transmitted.

10. A method comprising:
receiving, from a client application, a first set of information for a user interface of a software application executed at a remote server, wherein the first set of information includes first content to be presented to a user of the client application;
determining that the user lacks permission to access at least a subset of the first content based on permissions for the user;
responsive to determining that the user lacks permission to access at least the subset of the first content, modifying the first content to remove at least the subset of the first content to generate a modified first content;
generating a first set of media instructions for a user browser, the first set of media instructions including the modified first content; and
transmitting, to the user browser at a computing device of the user, the first set of media instructions, wherein the first set of media instructions represent the user interface including the modified first content.

11. The method of claim 10, wherein modifying the subset of the first content the comprises:
excluding at least the subset of the first content based on the permissions.

12. The method of claim 11, wherein, responsive to determining that the user lacks permission to access at least the subset of the first content, the method further comprises:
transmitting a notification to the user browser that accessing the subset of the first content is forbidden.

13. The method of claim 10, wherein the method further comprises:
receiving, from the computing device of the user, control inputs to the user browser; and
transmitting the control inputs to the client application.

14. The method of claim 10, wherein the method further comprises:
receiving user content from the user browser;
based on the permissions, modifying at least a subset of the user content; and
transmitting the modified user content to the client application.

15. The method of claim 10, wherein the method further comprises:
identifying the first content by scraping the first content from the first set of information.

16. The method of claim 10, wherein the method further comprises:
receiving from the client application, a second set of information for the user interface, wherein the second set of information includes second content to be presented to the user of the client application;
based on the permissions, determining that the user is authorized to access an entirety of the second content;
generating a second set of media instructions for the user browser, the second set of media instructions including the second content; and
transmitting, to the user browser at a computing device of the user, the second set of media instructions, wherein second set of media instructions represent the user interface including the second content.

17. The method of claim 10, wherein:
receiving the first set of information comprises receiving the first set of information from a client server communicatively connected to the remote server; and
the first set of information includes content from the remote server and user interface information from the client.

18. The method of claim 10, wherein determining the permissions is based on one or more of: permissions of the user, behaviors of the user, context of a user device, and anomalous pattern associated with data transmitted.

19. A system comprising one or more hardware processors and a non-transitory computer readable medium storing program instructions that, when executed by the one or more hardware processors, causes performance of operations comprising:
receiving, from a client application, a first set of information for a user interface of a software application executed at a remote server, wherein the first set of information includes first content to be presented to a user of the client application;
determining that the user lacks permission to access at least a subset of the first content based on permissions for the user;
responsive to determining that the user lacks permission to access at least the subset of the first content, modifying the first content to remove at least the subset of the first content to generate a modified first content;
generating a first set of media instructions for a user browser, the first set of media instructions including the modified first content; and
transmitting, to the user browser at a computing device of the user, the first set of media instructions, wherein the first set of media instructions represent the user interface including the modified first content.

20. The system of claim 19, wherein modifying the subset of the first content the comprises:
excluding at least the subset of the first content based on the permissions.

21. The system of claim 20, wherein, responsive to determining that the user lacks permission to access at least the subset of the first content, the operations further comprise:
transmitting a notification to the user browser that accessing the subset of the first content is forbidden.

22. The system of claim 19, wherein the operations further comprise:
receiving, from the computing device of the user, control inputs to the user browser; and
transmitting the control inputs to the client application.

23. The system of claim 19, wherein the operations further comprise:
receiving user content from the user browser;
based on the permissions, modifying at least a subset of the user content; and
transmitting the modified user content to the client application.

24. The system of claim 19, wherein the operations further comprise:
identifying the first content by scraping the first content from the first set of information.

25. The system of claim 19, wherein the operations further comprise:
- receiving from the client application, a second set of information for the user interface, wherein the second set of information includes second content to be presented to the user of the client application;
- based on the permissions, determining that the user is authorized to access an entirety of the second content;
- generating a second set of media instructions for the user browser, the second set of media instructions including the second content; and
- transmitting, to the user browser at a computing device of the user, the second set of media instructions, wherein second set of media instructions represent the user interface including the second content.

26. The system of claim 19, wherein:
- receiving the first set of information comprises receiving the first set of information from a client server communicatively connected to the remote server; and
- the first set of information includes content from the remote server and user interface information from the client.

27. The system of claim 19, wherein determining the permissions is based on one or more of: permissions of the user, behaviors of the user, context of a user device, and anomalous pattern associated with data transmitted.

* * * * *